(12) United States Patent
Bordow et al.

(10) Patent No.: US 12,244,699 B1
(45) Date of Patent: Mar. 4, 2025

(54) SYSTEM AND METHODS FOR AUTHENTICATION BETWEEN MULTIPLE DEVICES USING N-WAY ENTANGLEMENT

(71) Applicant: Wells Fargo Bank, N.A., San Francisco, CA (US)

(72) Inventors: Peter Bordow, Fountain Hills, AZ (US); Jeff J. Stapleton, O'Fallon, MO (US); Richard Orlando Toohey, Tempe, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 199 days.

(21) Appl. No.: 18/168,171

(22) Filed: Feb. 13, 2023

(51) Int. Cl.
*H04L 9/08* (2006.01)
*H04L 9/14* (2006.01)

(52) U.S. Cl.
CPC .......... *H04L 9/0852* (2013.01); *H04L 9/0866* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 7,359,512 B1* | 4/2008 | Elliott | ................... | H04L 9/0858 380/263 |
| 8,934,629 B2* | 1/2015 | Hamachi | ............... | H04W 48/16 370/503 |
| 2014/0181522 A1* | 6/2014 | Tanizawa | ................ | H04L 63/06 713/171 |
| 2017/0237558 A1* | 8/2017 | Yuan | ......................... | H04L 9/12 380/279 |
| 2020/0403787 A1* | 12/2020 | Islam | ..................... | H04L 9/0852 |
| 2023/0014894 A1* | 1/2023 | M M | ..................... | H04W 8/186 |
| 2024/0113870 A1* | 4/2024 | Alshowkan | ........... | H04L 9/0643 |

OTHER PUBLICATIONS

Deny R. Hamel, et al., Direct Generation of Three-Photon Polarization Entanglement, Apr. 28, 2014.

(Continued)

*Primary Examiner* — Jonathan A Bui
(74) *Attorney, Agent, or Firm* — K&L Gates LLP

(57) ABSTRACT

Systems, apparatuses, methods, and computer program products are disclosed for authentication between multiple devices using N-way entangled particles. Any number (N) of entangled particles may be distributed to any number of devices within a distributed system to facilitate authentication between multiple devices. An example authentication method includes: generating, by a secure key generator of a first participating device, a first key based on one or more quantum entangled particles; determining, by communications hardware of the first participating device, that a connection to a second participating device could not be established or maintained; in response to the determining, by the communications hardware, transmitting a first connection request to establish a connection with a third participating device; receiving, by the communications hardware, an acknowledgement to instantiate the connection with the third participating device; and establishing, by the communications hardware, the connection with the third participating device.

20 Claims, 17 Drawing Sheets

(56) References Cited

OTHER PUBLICATIONS

Bo Jing, et al., Hybrid Entanglement of Three Quantum Memoires with Three Photons, Aug. 16, 2018.
Quantum Entanglement of Three Spin Qubits Demonstrated in Silicon, Riken, Sep. 3, 2021, https://www.riken.jp/en/hews_pubs/research_news/rr/20210903_1/.
Davide Castelvecchi, Quatum Network is Step Towards Ultrasecure Internet, Feb. 17, 2021, https://nature.com/articles/d41586-021-00420-5.
Taketa, Kenta, et ai. "Quantum tomography of an entangled three-qubit state in silicon." Nature Nanotechnol. 16, 965-969 (2021).
Mcconneil, Robert, et al. "Entanglement with negative Wigner function of almost 3,000 atoms heralded by one photon." Nature 519, 439-442 (20•15).
Jeff J Stapleton et al, U.S. Appl. No. 18/464,850, filed Sep. 11, 2023.

* cited by examiner

SYSTEM AND METHODS FOR AUTHENTICATION BETWEEN MULTIPLE DEVICES USING N-WAY ENTANGLEMENT

BACKGROUND

Quantum key distribution (QKD) establishes a shared symmetric key between a plurality of communicating parties. QKD protocols rely upon quantum mechanics to mitigate the risk of a man-in-the-middle attack, during which a third party eavesdrops on a transmission between parties to duplicate the shared key. Some QKD protocols (e.g., E91) use quantum entangled particles (photons) while others (e.g., BB84) use quantum non-entangled particles (photons).

BRIEF SUMMARY

Modern communication systems may be highly distributed, increasing the need for secure device authentication during the transmission and reception of sensitive data. One method to securely authenticate devices within a distributed system involves distribution of particles via transmission mediums (e.g., fiber optics, etc.) to a desired recipient (e.g., to be authenticated). Such authentication using entangled particles allows for improved communication security between devices by preventing intercepted sensitive data from being accessible to unintended recipients.

As one method for improving device authentication security within a distributed system, systems, apparatuses, methods, and computer program products are disclosed herein for authentication between multiple devices using N-way entangled particles (also referred to herein as "N-way entanglement"). Embodiments herein allow for the generation and distribution of any number (N) of entangled particles to any number of devices within a distributed system. This advantageously allows for multiple devices to be authenticated using a single authentication scheme to secure transmission of sensitive information. For example, as a practical application of embodiments herein, N-way entanglement allows for three devices (e.g., a user device and two servers) to receive entangled particles that may be used to establish identical cryptographic keys. In the event the user device is disconnected from one of the servers, the user device is still able to securely connect to the other server, which has established an identical key. As a result, embodiments herein directly improve authentication between multiple devices and communication security in the field of network security and communications.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
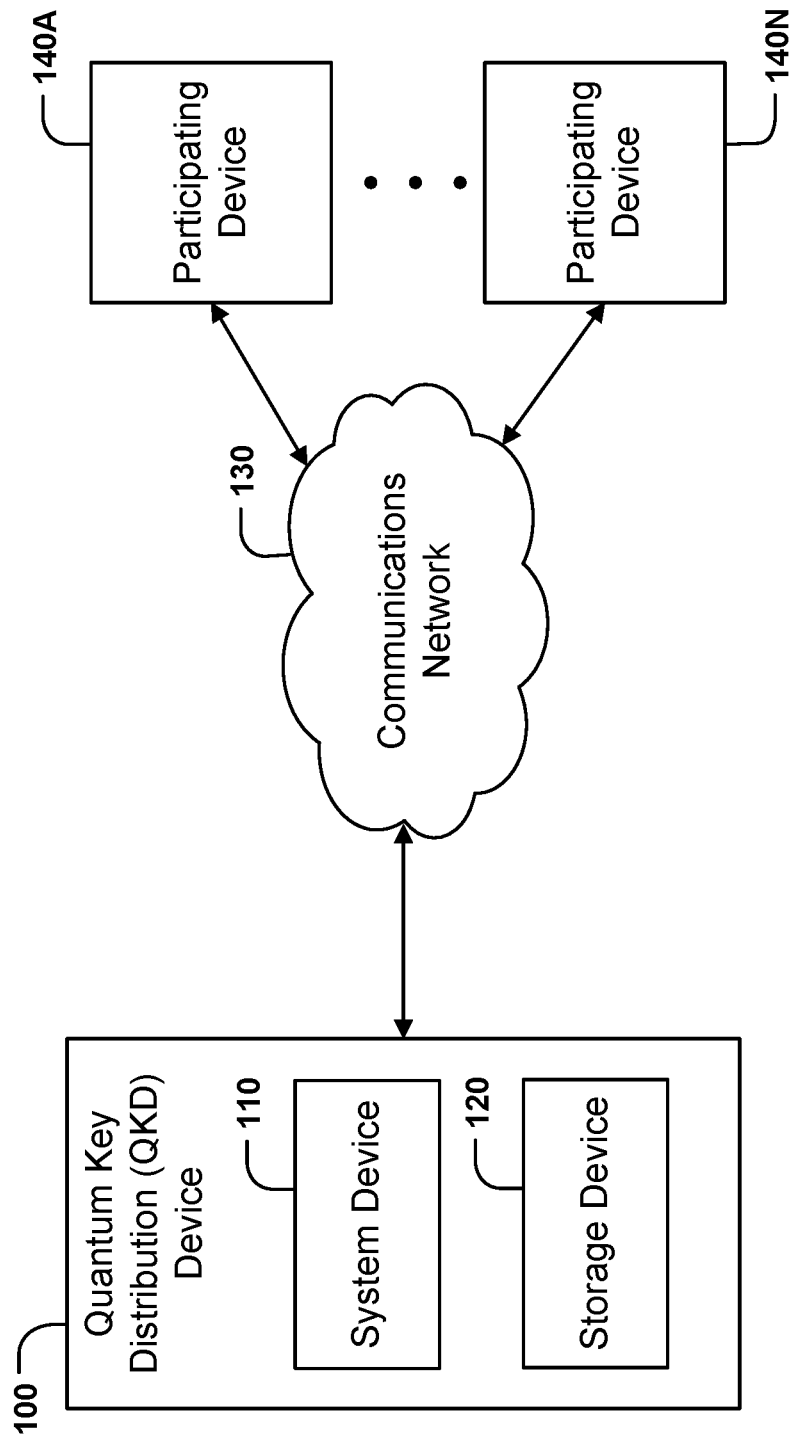
FIG. 1 illustrates a system in which some example embodiments may be used.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Methods, apparatuses, systems, and computer program products are described herein that provide for the use of N-way entangled particles for authentication between multiple devices within a distributed system. In particular, authentication of devices in a distributed system may be challenging due to the distance between the devices and the complexity of the environment in which the devices reside.

As one improvement in device authentication security, example embodiments described herein provide for authentication between multiple devices using N-way entangled particles. N-way entanglement allows for any number (N) of entangled particles to be distributed to any number of devices within a distributed system. Devices that receive the N-way entangled particles may participate in the secure transmission of sensitive information as described below in a series of examples.

In a first example, authentication between multiple devices may facilitate completion of a failover process in the event a connection between two or more of the authenticated devices cannot be established or maintained (e.g., lost, disconnected, terminated, etc.). The connection may not be established or maintained due to, for example, network disruptions, device hardware or software errors, external issues (e.g., sunspots, electromagnetic pulses (EMPs), or the like), and/or other factors. To facilitate the failover process, the N-way entangled particles may be distributed to a device, a first server, and a second server. The device may attempt to establish a secure connection to the first server. An error may occur with the connection request (e.g., the connection request may time out, may receive an error code in response, and/or an existing connection to the first server may be lost). Rather than waiting to establish a new connection with the disconnected first server and/or distributing a new key to the device and first server (e.g., via additional entangled particles), the device may instead attempt to connect to the second server. By distributing entangled particles to multiple devices, secure connections may be maintained without requiring distribution of a new key (i.e., the initially distributed key held by the second server may be used to authenticate the device).

In a second example, N-way entangled particles may be distributed to any number of devices to facilitate secure group messaging. For example, one device may broadcast a message and multiple devices may receive and decode the message. The message may be encoded using at least a portion of a key derived from the entangled particles, a message authentication code (MAC), or both (cipher-based message authentication code (CMAC)). This way, all devices provided with the key using the N-way entangled particles will be able to decode the message while devices not provided with the N-way entangled particles will not be able to decode the message. For example, a third-party device attempting to intercept the broadcasted message may not be able to decode the message, as the third-party device was not provided with the N-way entangled particles containing the key.

In a third example, N-way entangled particles may be distributed to multiple devices, one of which may be located in a demilitarized zone (DMZ) portion of a communications network between a public portion of the communications network and a private portion of the communications network. By doing so, a first device outside of the private portion may transmit secure messages to a third device inside the private portion via a second device disposed within the DMZ portion. The second device within the DMZ portion may confirm that the first and second device have permission to communicate (e.g., have both received entangled particles and, therefore, a shared key) prior to forwarding the message to the third device within the private portion.

Although a high-level explanation of the operations of embodiments has been provided above, specific details regarding the configuration of such embodiments are provided below.

System Architecture

Example embodiments described herein may be implemented using any of a variety of computing devices or servers. To this end, FIG. 1 illustrates an example environment within which various embodiments may operate. As illustrated, the environment may include a QKD device 100 including a system device 110 and a storage device 120, a communications network 130 (e.g., the Internet), and any number of participating devices 140A-140N. Although system device 110 and storage device 120 are described in singular form, some embodiments may utilize more than one system device 110 and/or more than one storage device 120. Additionally, some embodiments of the QKD device 100 may not require a storage device 120 at all. Whatever the implementation, the QKD device 100, and its constituent system device(s) 110 and/or storage device(s) 120 may receive and/or transmit information via communications network 130 and/or directly with any number of other devices, such as one or more of participating devices 140A-140N.

System device 110 may be implemented as one or more servers, which may or may not be physically proximate to other components of the environment. Furthermore, some components of system device 110 may be physically proximate to the other components of the QKD device 100 while other components are not. System device 110 may receive, process, generate, and transmit data, signals, and electronic information to facilitate the operations of QKD device 100. Particular components of system device 110 are described in greater detail below with reference to apparatus 200 in connection with FIG. 2A.

Storage device 120 may comprise a distinct component from system device 110, or may comprise an element of system device 110 (e.g., memory 204, as described below in connection with FIG. 2A). Storage device 120 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 130). Storage device 120 may host the software executed to operate the QKD device 100. Storage device 120 may store information relied upon during operation of the QKD device 100, such as various streams of entangled particles, keys, key check values, and/or the like that may be used by the QKD device 100, data and documents to be analyzed and/or processed using the QKD device 100, such as log files, or the like. Additional components of QKD device 100 and their respective functions are described in more detail below with reference to apparatus 200 in connection with FIG. 2A.

The one or more participating devices 140A-140N may be embodied by any computing and/or storage devices known in the art, such as desktop or laptop computers, tablet devices, smartphones, wearable devices (e.g., smartwatches), or the like. In some embodiments, the one or more participating devices 140A-140N may include hardware security modules (HSMs) to facilitate encoding (e.g., encryption using digital signatures). The one or more participating devices 140A-140N need not themselves be independent devices, but may be peripheral devices communicatively coupled to other computing devices. Additional components of the participating devices 140A-140N and their respective functions are described in more detail below with reference to participating device 220 in connection with FIG. 2B.

Example Implementing Apparatuses

Figure 2A:
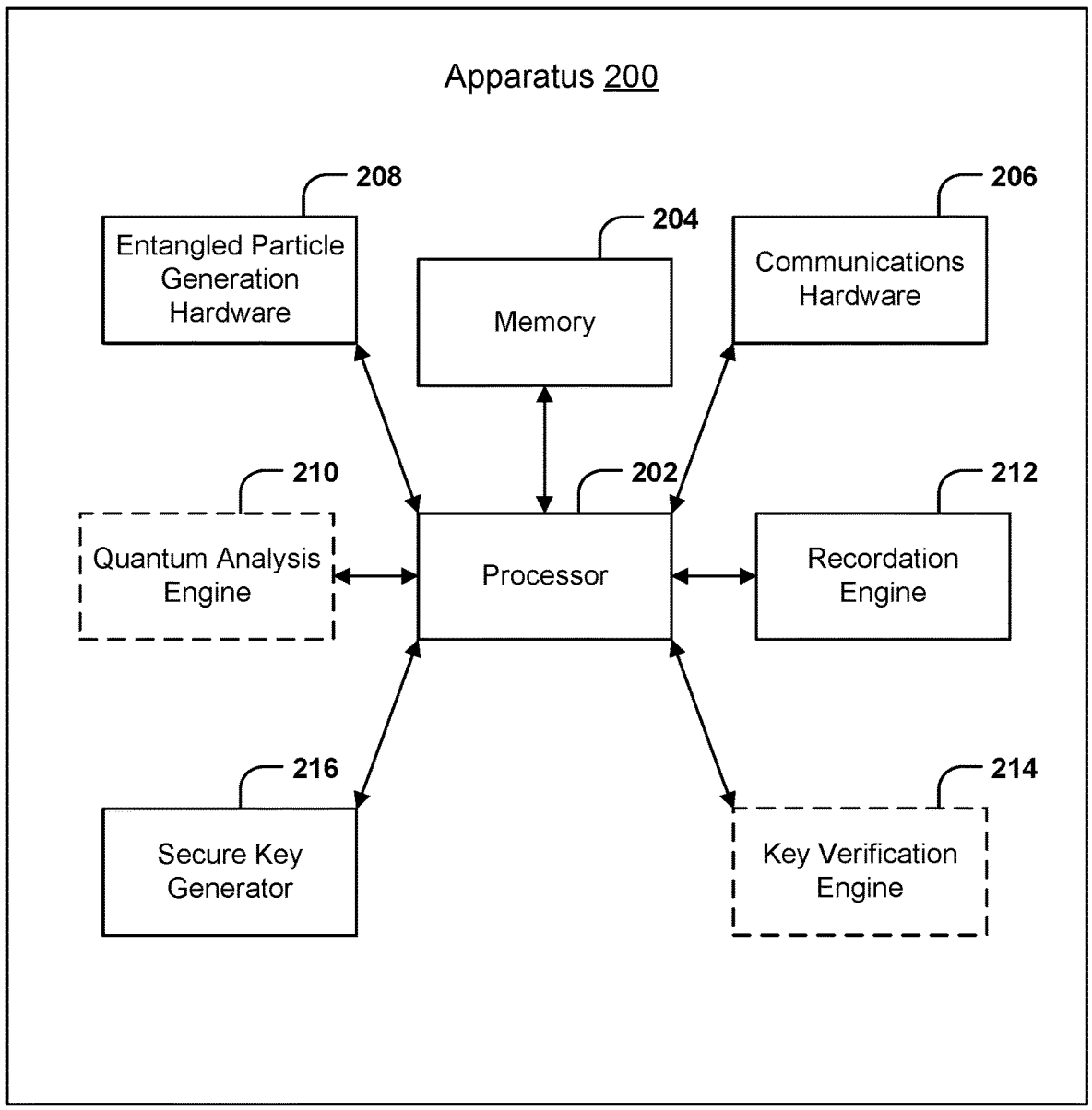
FIG. 2A illustrates a schematic block diagram of example circuitry embodying a quantum key distribution (QKD) device that may perform various operations in accordance with some example embodiments described herein.

System device 110 of the QKD device 100 (described previously with reference to FIG. 1) may be embodied by one or more computing devices or servers, shown as apparatus 200 in FIG. 2A. As illustrated in FIG. 2A, the apparatus 200 may include processor 202, memory 204, communications hardware 206 including input-output circuitry (not shown), entangled particle generation hardware 208, quantum analysis engine 210, recordation engine 212, key verification engine 214, and a secure key generator 216, each of which will be described in greater detail below. While the various components are only illustrated in FIG. 2A as being connected with processor 202, it will be understood that the apparatus 200 may further comprise a bus (not expressly shown in FIG. 2A) for passing information amongst any combination of the various components of the apparatus 200. The apparatus 200 may be configured to execute various operations described above in connection with FIG. 1 and below in connection with FIGS. 5A-5B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 120, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means suitable for transmitting the N-way entangled particles, such as a device or circuitry embodied in either hardware or a combination of hardware and software that is configured to receive and/or transmit data from/to any other device, engine, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processor for causing transmission of such signals to a network or for handling receipt of signals received from a network. In some embodiments, the communications hardware 206 may include, for example, interfaces such as one or more ports (e.g., a laser port, a fiber-optic cable port, and/or the like) for enabling communications with other devices.

The communications hardware 206 may include input-output circuitry (not shown) configured to provide output to a user and, in some embodiments, to receive an indication of user input. It will be noted that some embodiments will not include input-output circuitry, in which case user input may be received via a separate device such as a separate client device or the like. The input-output circuitry of the communications hardware 206 may comprise a user interface, such as a display, and may further comprise the components that govern use of the user interface, such as a web browser, mobile application, dedicated client device, or the like. In some embodiments, the input-output circuitry may include a keyboard, a mouse, a touch screen, touch areas, soft keys, a microphone, a speaker, and/or other input/output mechanisms. The input-output circuitry may utilize the processor 202 to control one or more functions of one or more of these user interface elements through software instructions (e.g., application software and/or system software, such as firmware) stored on a memory (e.g., memory 204) accessible to the processor 202.

In some embodiments, the communications hardware 206 is designed to inject quantum data (e.g., entangled particle(s) or key(s)) into another device (e.g., any of participating devices 140A-140N). The communications hardware 206 may utilize processor 202, memory 204, and other hardware components included in the apparatus 200 to perform these operations, as described in connection with FIGS. 5A-8B below. The communications hardware 206 may further gather data from a variety of sources (e.g., storage device 120, as shown in FIG. 1, entangled particle generation hardware 208, or the like), may utilize the input-output circuitry (not shown) of the communications hardware 206 to receive data from a user, and in some embodiments may utilize a transmission medium to inject quantum data into various device, or otherwise cause transmission of various data.

Further, communications hardware 206 may include devices for simultaneous transmission of entangled particles from the entangled particle generation hardware 208 and carrier signals on which data (which may include sensitive data, such as metadata relating to the generation of quantum data such as timestamps and/or the like) is encoded on a transmission medium such as an optical fiber, free space, laser, or other similar mediums.

In addition, the apparatus 200 further comprises entangled particle generation hardware 208 that generates one or more sets of N-way entangled particles. Each of the one or more sets of N-way entangled particles may include any number (N) of entangled particles where N is a non-negative integer. For example, entangled particle generation hardware 208 may generate two-way entangled particles or may generate three-way entangled particles (e.g., each of the three particles making up the three-way entangled particles are entangled with one another). The entangled particle generation hardware 208 may utilize processor 202, memory 204, or any other hardware component included in the apparatus 200 to perform these operations, as described in connection with FIGS. 5A-8B below. The entangled particle generation hardware 208 may further utilize communications hardware 206 to gather data from a variety of sources (e.g., storage device 120, as shown in FIG. 1), may utilize the input-output circuitry (not shown) of the communications hardware 206 to receive data from a user, and in some embodiments may utilize processor 202 and/or memory 204 to generate one or more sets of N-way entangled particles.

In addition, the apparatus 200 may further comprise quantum analysis engine 210 that determines whether devices are quantum-enabled (e.g., whether the devices are able to receive, read, and/or otherwise process entangled particles). The quantum analysis engine 210 may utilize processor 202, memory 204, or any other hardware component included in the apparatus 200 to perform these operations, as described in connection with FIGS. 5A-8B below. The quantum analysis engine 210 may further utilize communications hardware 206 to gather data from a variety of sources (e.g., participating devices 140A-140N and/or storage device 120, as shown in FIG. 1), may the utilize input-output circuitry (not shown) of the communications hardware 206 to receive data from a user, and in some embodiments may utilize processor 202 and/or memory 204 to determine whether one or more devices are quantum-enabled.

In addition, the apparatus 200 further comprises recordation engine 212 that generates log files relating to generation and injection of entangled particles and/or secure keys. The recordation engine 212 may utilize processor 202, memory 204, or any other hardware component included in the apparatus 200 to perform these operations, as described in connection with FIGS. 5A-8B below. The recordation engine 212 may further utilize communications hardware 206 to gather data from a variety of sources (e.g., participating devices 140A-140N, and/or storage device 120, as shown in FIG. 1), may utilize the input-output circuitry (not shown) of the communications hardware 206 to receive data from a user, and in some embodiments may utilize processor 202 and/or memory 204 to generate a log file comprising one or more indications of events associated with the generation or injection of entangles particles and/or keys.

In addition, the apparatus 200 may further comprise key verification engine 214 that compares keys (which are discussed in more detail below) and determines whether the keys match. In some embodiments, the key verification engine 214 may further be configured to generate the keys. The key verification engine 214 may utilize processor 202, memory 204, or any other hardware component included in the apparatus 200 to perform these operations, as described in connection with FIGS. 5A-8B below. The key verification engine 214 may further utilize communications hardware 206 to gather data from a variety of sources (e.g., participating devices 140A-140N, and/or storage device 120, as shown in FIG. 1), may utilize the input-output circuitry (not shown) of the communications hardware 206 to receive data from a user, and in some embodiments may utilize processor 202 and/or memory 204 to determine whether a first key matches a second key.

Finally, the apparatus 200 further comprises a secure key generator 216 that generates a key (which is discussed in more detail below). The secure key generator 216 may utilize processor 202, memory 204, or any other hardware component included in the apparatus 200 to perform these operations, as described in connection with FIGS. 5A-8B below. The secure key generator 216 may further utilize communications hardware 206 to gather data from a variety of sources (e.g., storage device 120, as shown in FIG. 1), may utilize the input-output circuitry (not shown) of the communications hardware 206 to receive data from a user, and in some embodiments may utilize processor 202 and/or memory 204 to measure entangled particles and generate a key based on the measurement of the entangled particles. The secure key generator 216 may be any means such as one or more devices or circuitry embodied in either hardware or a combination of hardware and software that is configured to measure entangled particles and generate keys. In some embodiments, the functionality of the secure key generator 216 may be invoked by the quantum analysis engine 210 in response to determining that a particular device is not quantum-enabled.

Although components 202-216 are described in part using functional language, it will be understood that the particular implementations necessarily include the use of particular hardware. It should also be understood that certain of these components 202-216 may include similar or common hardware. For example, the quantum analysis engine 210, recordation engine 212, key verification engine 214, and secure key generator 216 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the entangled particle generation hardware 208, quantum analysis engine 210, recordation engine 212, key verification engine 214, and secure key generator 216 may leverage processor 202, memory 204, or communications hardware 206 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, or communications hardware 206 for enabling any functions not performed by special-purpose hardware elements. In all embodiments, however, it will be understood that the entangled particle generation hardware 208, quantum analysis engine 210, recordation engine 212, key verification engine 214, and secure key generator 216 are implemented via particular machinery designed for performing the functions described herein in connection with such elements of apparatus 200.

Figure 2B:
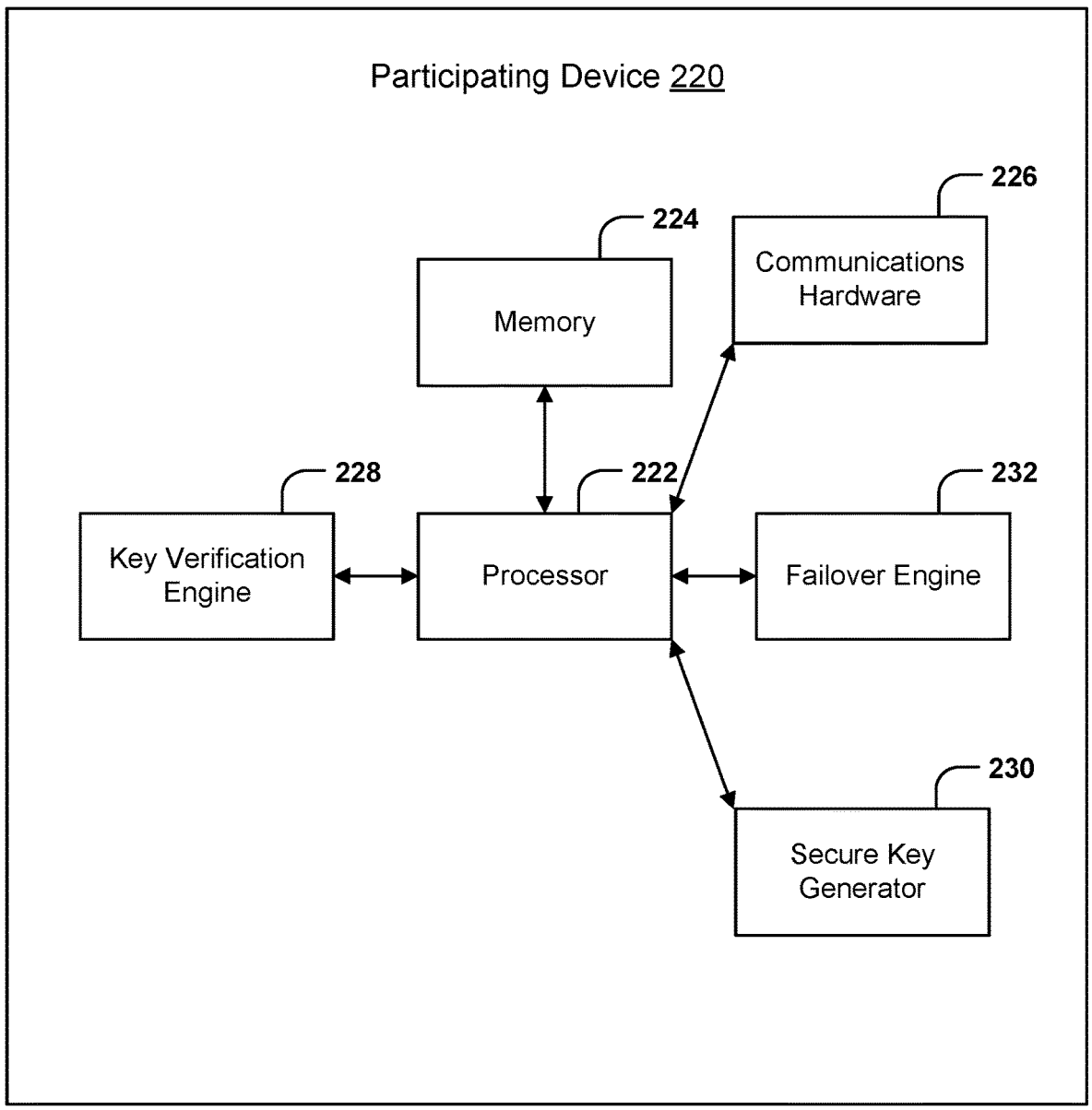
FIG. 2B illustrates a schematic block diagram of example circuitry embodying a participating device that may perform various operations in accordance with some example embodiments described herein.

Turning to FIG. 2B, a participating device 220 is shown that represents an example participating device (e.g., any one of participating devices 140A-140N described previously with reference to FIG. 1). The participating device 220 includes processor 222, memory 224, communications hardware 226, key verification engine 228, and secure key generator 230, each of which is configured to be similar to the similarly named components described above in connection with FIG. 2A.

In addition to the above-referenced components, the participating device 220 also includes failover engine 232, which includes hardware components designed for performing a failover process in the event a first participating device (e.g., participating device 140A described previously with reference to FIG. 1) is disconnected from a second participating device (e.g., any other participating device of the participating devices 140A-140N described previously with reference to FIG. 1 different from the first participating device). The failover engine 232 may utilize processor 222, memory 224, or any other hardware component(s) included in participating device 220 to perform these operations, as described in connection with FIGS. 6A-8B below. The failover engine 232 may further utilize communications hardware 226 to communicate with QKD device 100 (described in reference to FIG. 1), or may otherwise utilize processor 222 and/or memory 224 to perform a failover process in order to initiate a connection to a third participating device (e.g., any other participating device of the participating devices 140A-140N described previously with reference to FIG. 1 different from the first and second participating devices) in the event of a lost connection between the first participating device and the second participating device.

In some embodiments, various components of the apparatus 200 and the participating device 220 may be hosted remotely (e.g., by one or more cloud servers) and thus need not physically reside on the apparatus 200 or the participating device 220. Thus, some or all of the functionality described herein may be provided by third party circuitry. For example, any one of the apparatus 200 or the participating device 220 may access one or more third party circuitries via any sort of networked connection that facilitates transmission of data and electronic information between the apparatus 200 or the participating device 220 and the third-party circuitries. In turn, that apparatus 200 or participating device 220 may be in remote communication with one or more of the other components describe above as comprising the apparatus 200 or the participating device 220.

As will be appreciated based on this disclosure, example embodiments contemplated herein may be implemented by an apparatus 200 or a participating device 220. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2A or participating device 220 as described in FIG. 2B, that loading the software instructions onto a computing device or apparatus produces a special-purpose machine comprising the means for implementing various functions described herein.

Figure 3A:
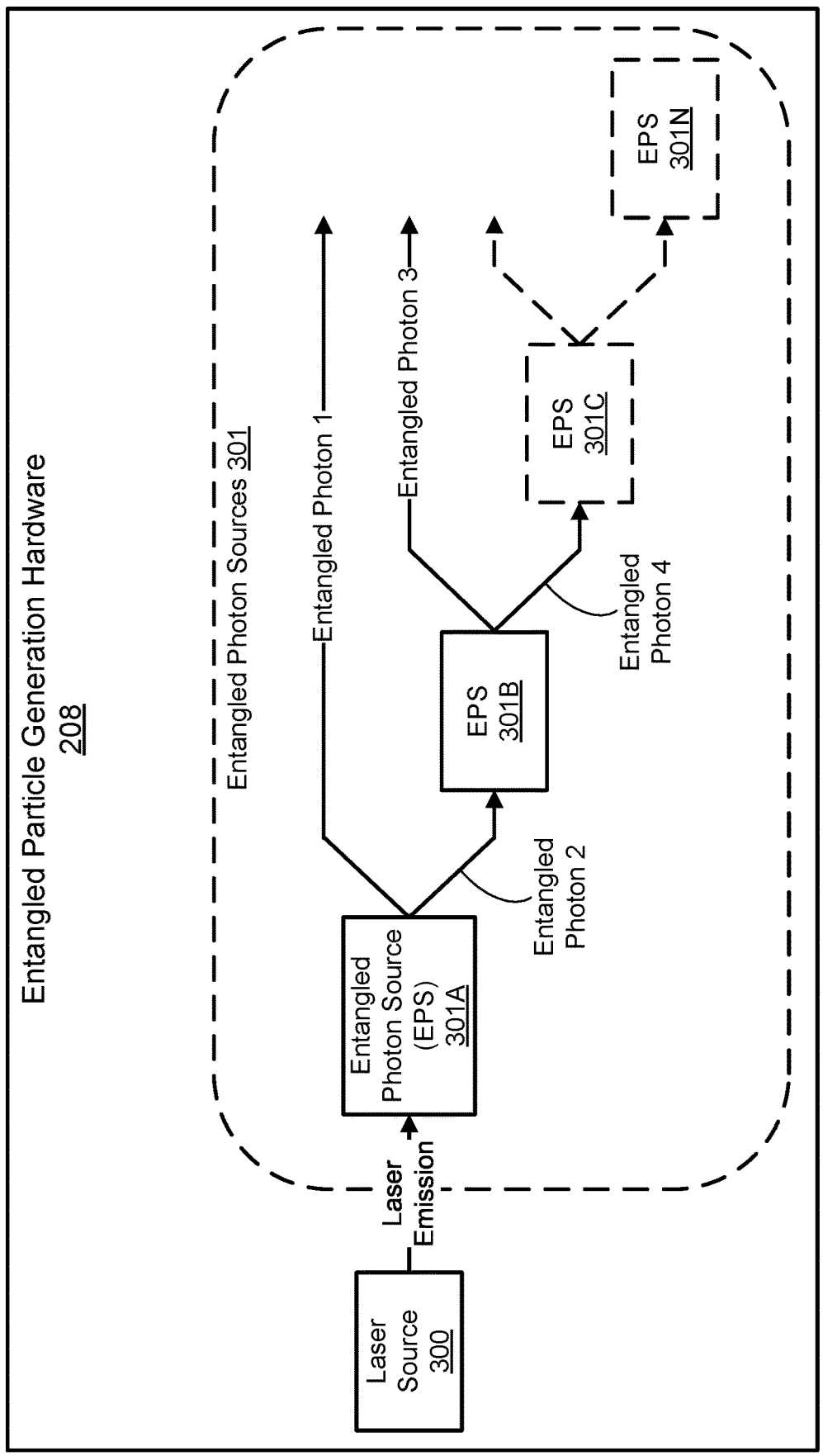
FIG. 3A illustrates a schematic block diagram of an example entangled particle generation hardware that may perform various operations in accordance with some example embodiments described herein.

Turning to FIG. 3A, a diagram of an example entangled particle generation hardware 208 is shown that may provide for the generation of N-way entangled particles (e.g., entangled photons). The system shown in FIG. 3A may include laser source 300 and at least two entangled photon sources 301. Laser source 300 may generate a laser emission (e.g., coherent optical radiation). The laser source 300 may be any type of laser generating device (e.g., a gas laser, chemical laser, excimer laser, solid-state laser, fiber laser, photonic crystal laser, etc.). The laser emission from laser source 300 may be used as a source of photons for the generation of entangled photons by entangled photon source (EPS) 301A, which is described in greater detail below in connection with FIG. 4A. One of the two photons exiting EPS 301A may thereafter be directed to EPS 301B for conversion into two additional photons entangled with the other photon exiting EPS 301A. The manner by which EPS 301B operates is described in greater detail below in connection with FIG. 4B.

Beyond EPS 301A and 301B, the entangled photons generation system may utilize any number of additional entangled photon sources (e.g., EPSs 301C-301N) to obtain an arbitrarily large set of entangled photons. For example, EPS 301A may generate a first pair of entangled photons (e.g., entangled photons 1 and 2). Entangled photon 2 may be directed to EPS 301B, where it may be converted into a second pair of entangled photons (e.g., entangled photons 3 and 4). Although entangled photon 2 is consumed during the creation of entangled photons 3 and 4, entangled photons 3 and 4 are also entangled with entangled photon 1, thus creating a three-way entanglement among entangled photons 1, 3, and 4. The process may continue iteratively with the addition of EPS 301C through EPS 301N to entangle any arbitrarily large number of photons.

Figure 3B:
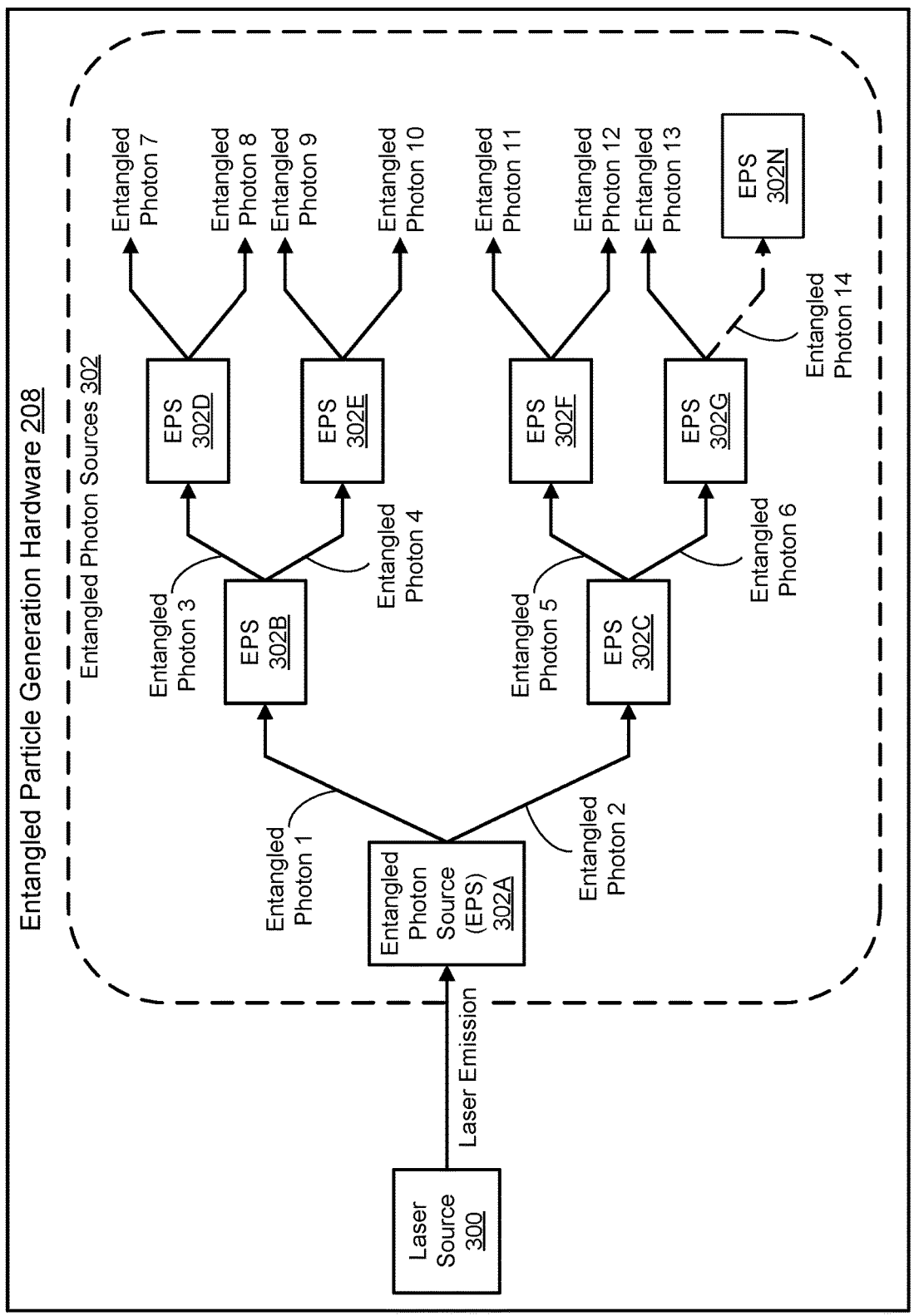
FIG. 3B illustrates a schematic block diagram of an example entangled particle generation hardware that may perform various operations in accordance with some example embodiments described herein.

Turning to FIG. 3B, a diagram of a second example entangled particle generation hardware 208 is shown. The second example hardware may also provide for the generation of N-way entangled photons. The system shown in FIG. 3B may operate similarly to the system shown in FIG. 3A, although FIG. 3B illustrates that the entangled photons emitted from a first EPS (in this case, EPS 302A) may each enter another EPS (here, EPS 302B and EPS 302C), and so forth. To do this, the system shown in FIG. 3B may include laser source 300 (shown previously in FIG. 3A) and entangled photon sources 302.

Entangled photon sources 302 may include any number of entangled photon sources (EPS) (e.g., 302A-302N) to obtain N-way entangled photons. For example, EPS 302A may generate a first pair of entangled photons (e.g., entangled photons 1 and 2). Entangled photon 1 may be directed to EPS 302B, where it may be converted into a second pair of entangled photons (e.g., entangled photons 3 and 4). Entangled photon 2 may be directed to EPS 302C, where it may be converted into a third pair of entangled photons (e.g., entangled photons 5 and 6). At this stage, entangled photons 3 and 4 are also entangled with entangled photons 5 and 6, creating a four-way entanglement.

As shown in FIG. 3B, entangled photons 3, 4, 5, and 6 continue to be directed to additional EPS systems, creating eight-way entanglement. For example, entangled photon 3 may be directed to EPS 302D, where it may be converted into entangled photons 7 and 8. Entangled photon 4 may be directed to EPS 302E, where it may be converted into entangled photons 9 and 10. Entangled photon 5 may be directed into EPS 302F, where it may be converted into entangled photons 11 and 12. Entangled photon 6 may be directed into EPS 302G, where it may be converted into entangled photons 13 and 14. This process may continue with any of the entangled photons being directed into another EPS (e.g., EPS 302N) to entangle any number of photons.

Figure 4A:
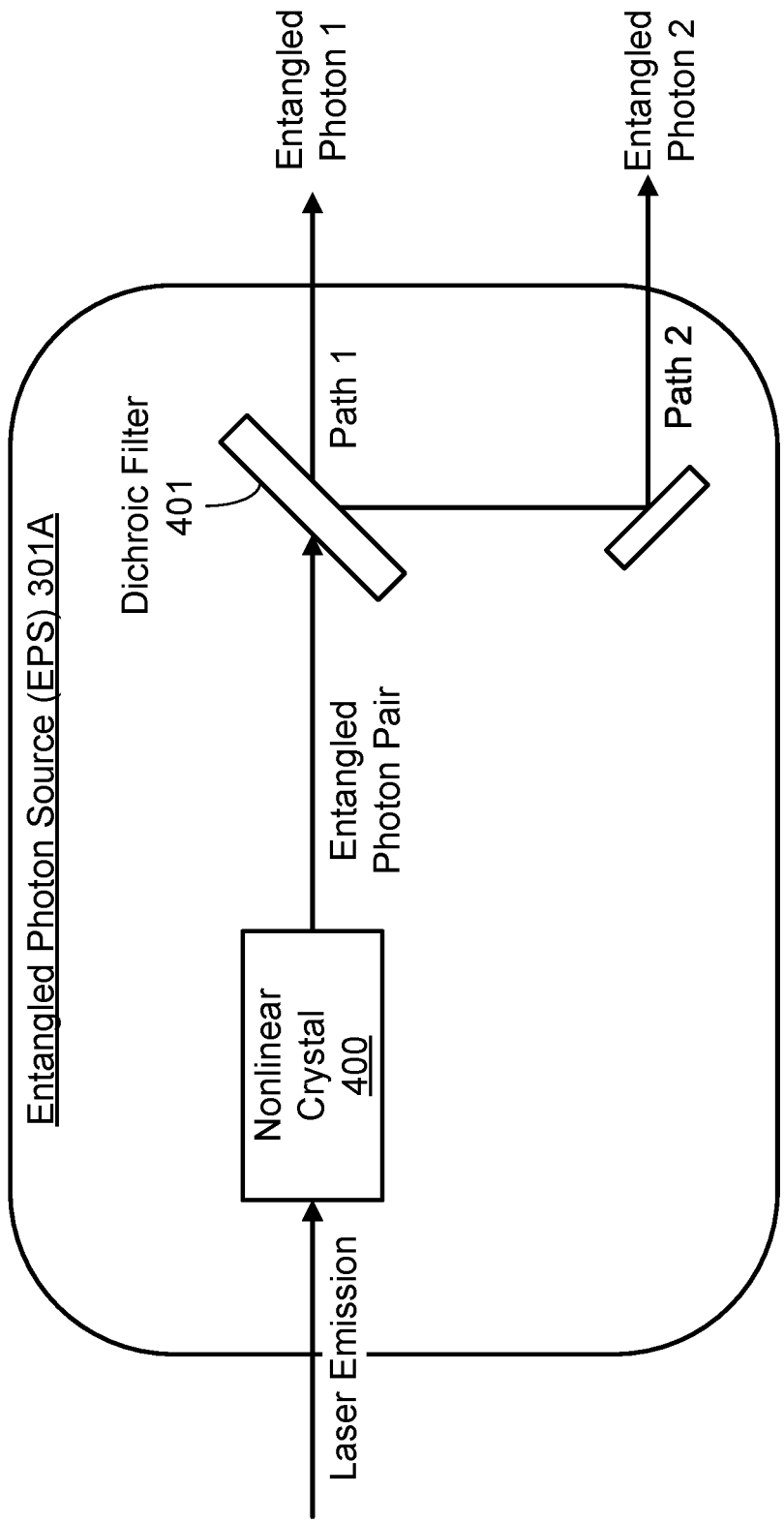
FIG. 4A illustrates a schematic block diagram of an example entangled photon source that may perform various operations in accordance with some example embodiments described herein.

Turning to FIG. 4A, a diagram of an example EPS (e.g., EPS 301A) is illustrated. As noted above, EPS 301A may provide for the generation of pairs of entangled photons. Each pair of entangled photons generated by EPS 301A may have less energy than the input photon and each photon of the pair of entangled photons may have a different wavelength. To provide this functionality, EPS 301A may include nonlinear crystal 400 and dichroic filter 401. Each of these components is described below.

In an embodiment, photons from laser source 300 (described in reference to FIG. 3A) enter EPS 301A and are directed along the beam path (e.g., indicated by the arrows and labels in FIG. 4A) by various guiding elements (e.g., mirrors and/or the like) to interact with nonlinear crystal 400. Nonlinear crystal 400 may be formed from any suitable material such as, for example, beta-barium borate, lithium niobate, or other material. Nonlinear crystal 400 may be selected based on the input laser wavelength and configured to induce the nonlinear optical process of spontaneous parametric down-conversion (SPDC). In the process of SPDC, photons from a laser (e.g., laser source 300) are converted into two lower-energy entangled photons following an interaction with the nonlinear crystal (e.g., nonlinear crystal 400). In one example, the resulting entangled photon pairs may be in an indeterminate polarization state upon generation.

Continuing with the above example, entangled photons may be directed out of EPS 301A. In order to exit EPS 301A, the entangled photon pairs may exit the nonlinear crystal 400 and be separated and directed by any number of optical filters and mirrors. For example, dichroic filter 401 may be used to separate the entangled photons by transmitting photons of one wavelength and reflecting photons of another wavelength. In this example, one entangled photon (e.g., entangled photon 1) may follow path 1 out of EPS 301A and the other entangled photon (e.g., entangled photon 2) may follow path 2 out of EPS 301A. Entangled photons exiting EPS 301A along paths 1 or 2 may be directed to EPS 301B (or any other EPS in entangled photon sources 301 or entangled photon sources 302) to generate N-way entanglement of photons through generation of additional entangled photons.

While described with respect to spontaneous parametric down conversion, entangled photon sources may generate entangled photons using different mechanisms without departing from embodiments disclosed herein. For example, two-photon emission from electrically driven semiconductors or other processes may be used to generate entangled photons.

Figure 4B:
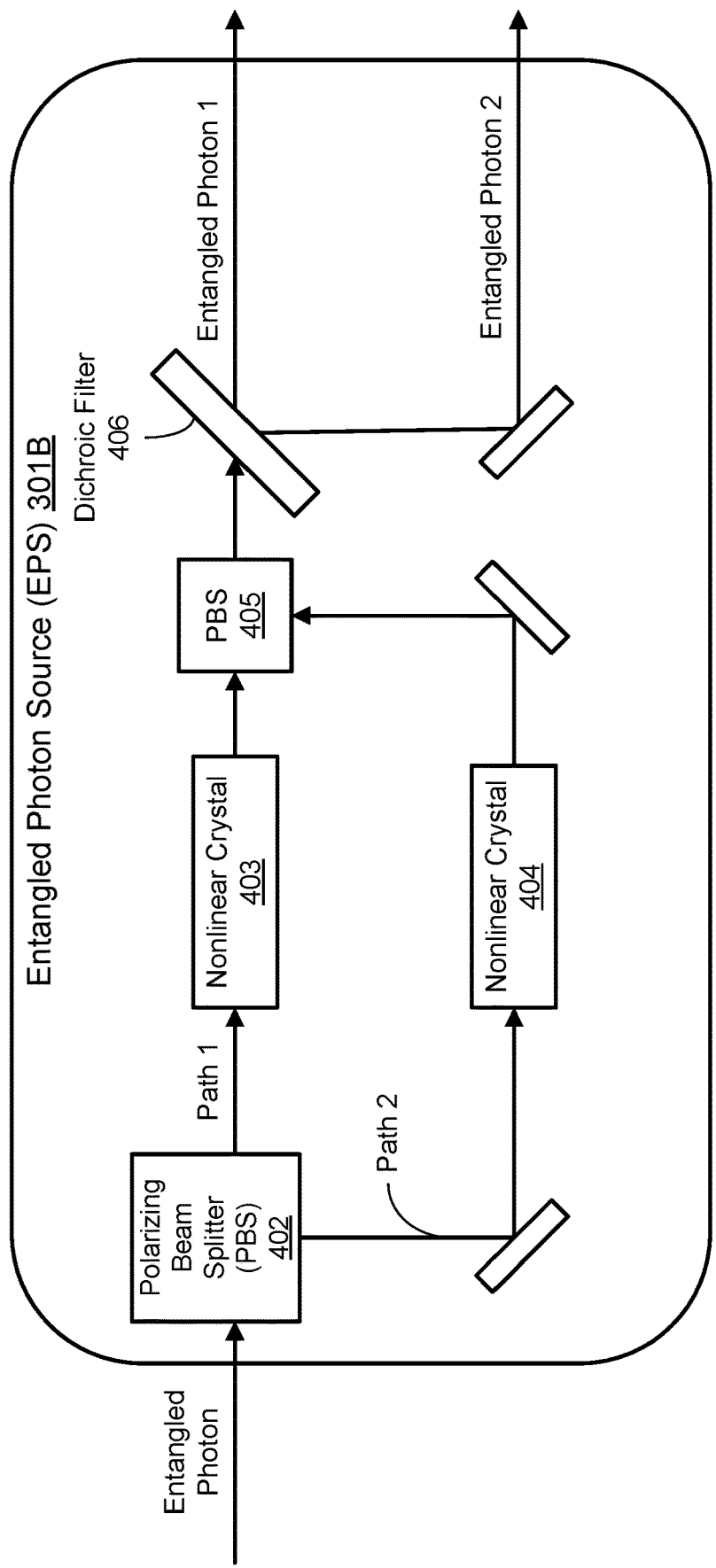
FIG. 4B illustrates a schematic block diagram of an example entangled photon source that may perform various operations in accordance with some example embodiments described herein.

Turning to FIG. 4B, a diagram of a second example EPS (e.g., EPS 301B) is illustrated. As noted above, EPS 301B may provide for the generation of pairs of entangled photons. To provide this functionality, EPS 301B may include polarizing beam splitter (PBS) 402, nonlinear crystal 403, nonlinear crystal 404, PBS 405, and dichroic filter 406. Each of these components is described below.

In an embodiment, one or more entangled photons enter EPS 301B and are directed along the beam path by any number of optical filters and mirrors to PBS 402. PBS 402 may be any physical device which separates horizontally polarized photons from vertically polarized photons. As the incoming entangled photon shown in FIG. 4B may be polarized, it may travel along path 1 or path 2 upon exiting PBS 402. For example, if the incoming entangled photons are horizontally polarized, they may be directed along path 1 and if the incoming entangled photons are vertically polarized, they may be directed along path 2.

If entangled photons travel along path 1, they may interact with nonlinear crystal 403. Nonlinear crystal 403 may be configured to induce SPDC of the entangled photons to generate additional entangled photon pairs as described above for nonlinear crystal 400. The nonlinear crystal 403 may be formed from any suitable material such as, for example, beta-barium borate, lithium niobate, or other material. The resulting entangled photon pairs may be in an indeterminate polarization state upon generation.

If entangled photons travel along path 2, they may interact with nonlinear crystal 404. Nonlinear crystal 404 may be configured to induce SPDC of the entangled photons to generate additional entangled photon pairs as described for nonlinear crystal 400. Nonlinear crystal 404 may be formed from any suitable material such as, for example, beta-barium borate, lithium niobate, or other material. The resulting entangled photon pairs may be in an indeterminate polarization state upon generation.

In an embodiment, the entangled photon pairs generated by either nonlinear crystal 403 or nonlinear crystal 404 may be directed out of EPS 301B by a series of optical filters, mirrors, and/or other components positioned along the beam path. One example of this beam path is shown in FIG. 4B. In this example, polarized entangled photons are directed from either path 1 or 2 by PBS 405 to dichroic filter 406 and separated by dichroic filter 406. The entangled photons are then directed out of EPS 301B. Entangled photons exiting EPS 301B may be directed to EPS 301C (or any other EPS in entangled photon sources 301 or entangled photon sources 302) to generate N-way entanglement of photons.

Figure 4C:
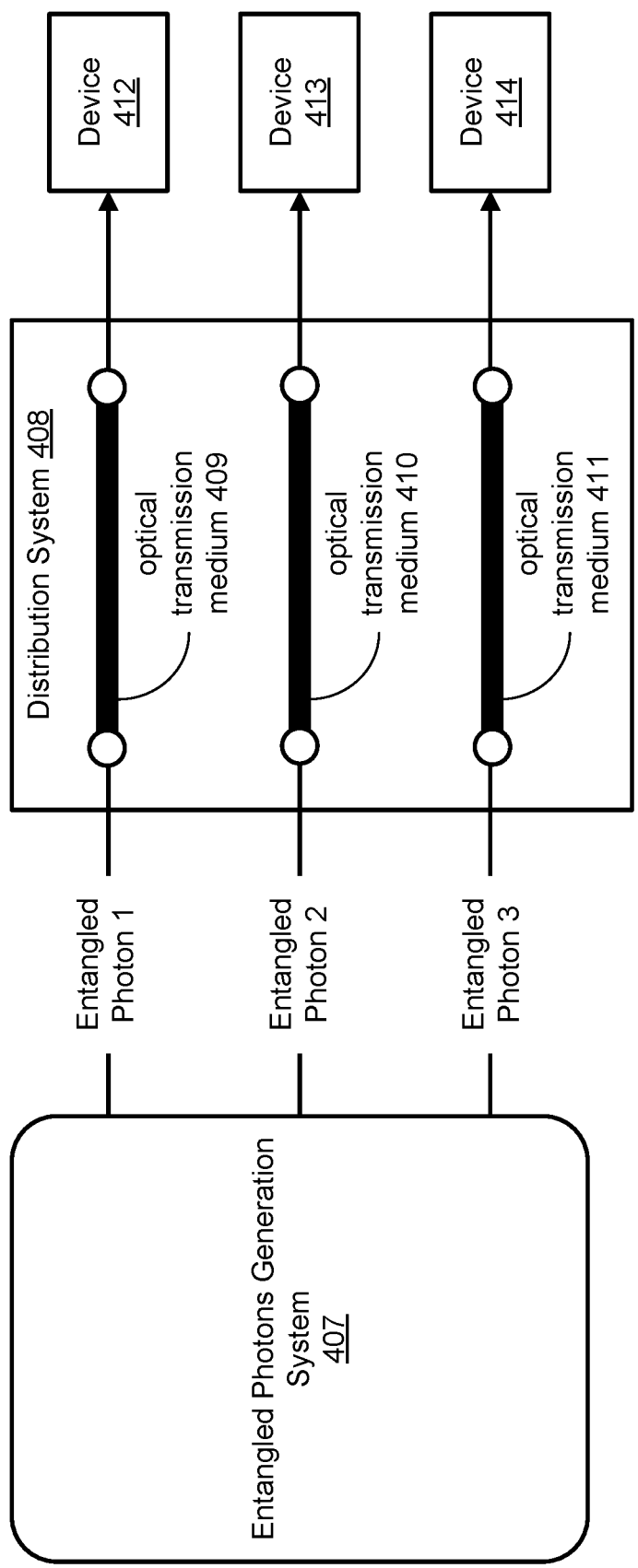
FIG. 4C illustrates a schematic block diagram of example hardware that may perform various operations in accordance with some example embodiments described herein.

Turning to FIG. 4C, a broader system in which the entangled photons generation system may be deployed is shown. The entangled photons generation system may generate discrete sets of N entangled photons, which may thereafter be used. In FIG. 4C, which illustrates a three-way entanglement system, entangled photons generation system 407 generates discrete sets of 3 entangled photons, with one photon of each entangled photon set being directed toward a corresponding device (e.g., entangled photon 1 is directed to device 412, entangled photon 2 to device 413, and entangled photon 3 to device 414). Through the iterative generation of additional entangled photons, the entangled photons generation system 407 may transmit a first set of photons to device 412, a second set of photons to device 413, and a third set of photons to device 414, such that each photon in the first set of photons is entangled with a corresponding photon in the second set of photons and also with a corresponding photon in the third set of photons.

The entangled photons may be distributed to various devices via a distribution system 408, which may include any number of optical transmission mediums 409, 410, 411, and/or other components for directing the entangled photons. For example, the optical transmission mediums 409-411 may be implemented with fiber optic cabling, free space transmission, etc.

While described above with reference to entangled photons, the distribution of entangled particles to enhance data security may be implemented using other types of entangled particles (e.g., electrons, neutrinos, etc.) without departing from embodiments disclosed herein.

Example Operations

Figure 5A:
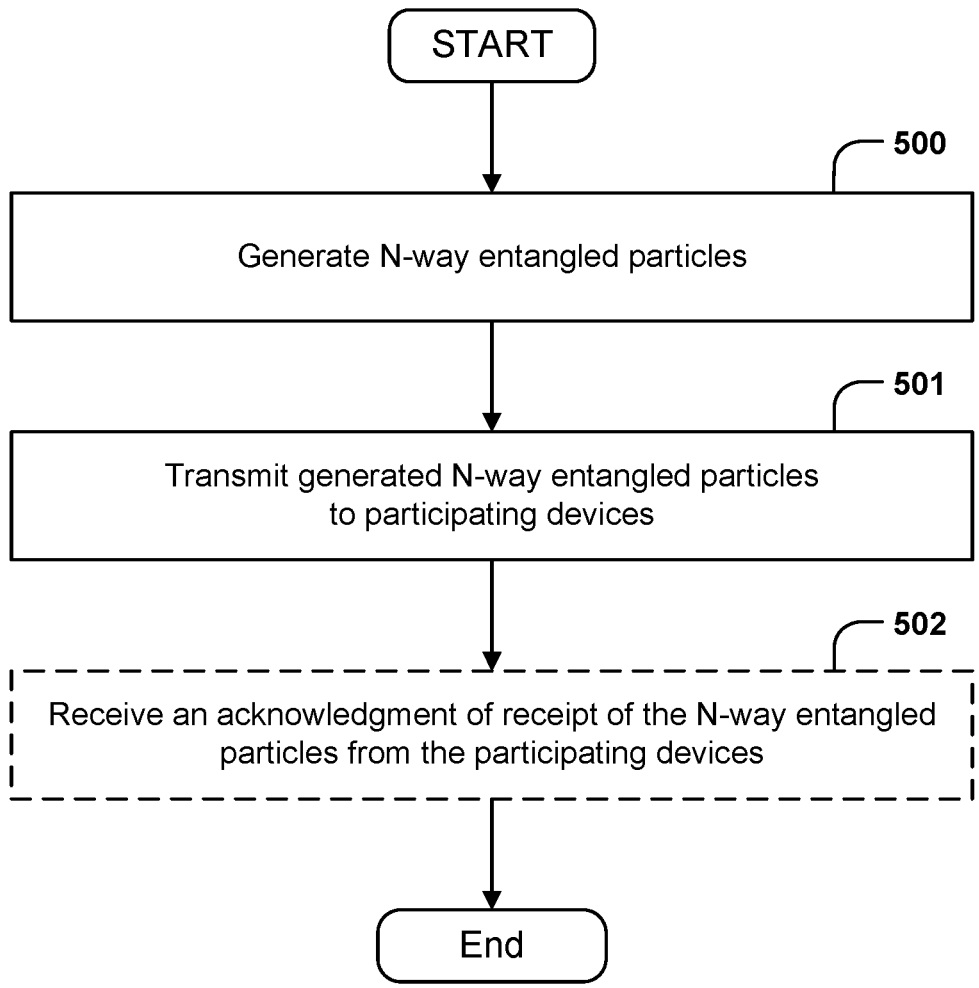
FIGS. 5A-5B illustrate example flowcharts for QKD of N-way entangled particles, in accordance with some example embodiments described herein.
Figure 5B:
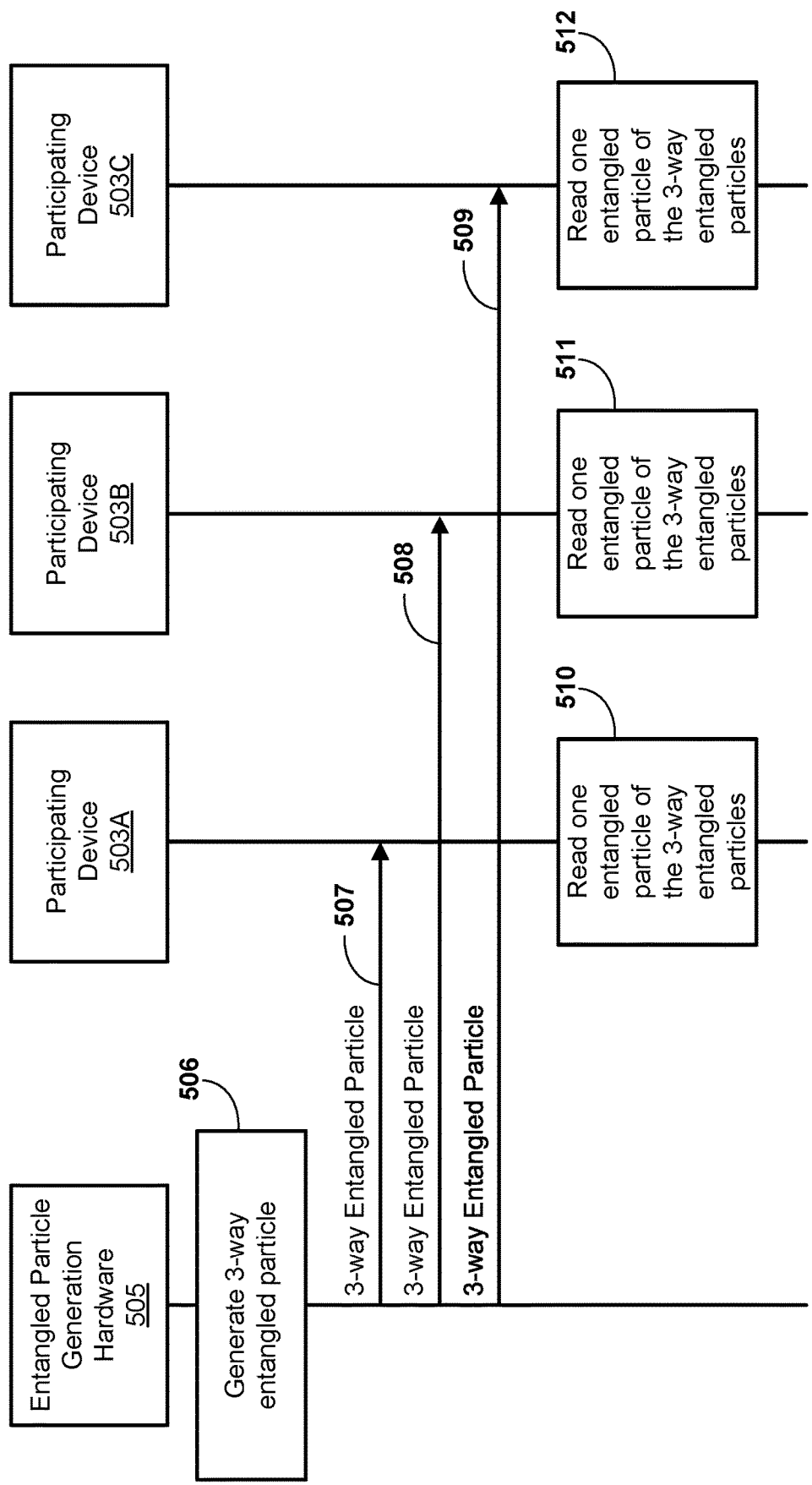

Turning to FIGS. 5A-5B, example flowcharts are illustrated that contain example operations implemented by example embodiments described herein. The operations illustrated in FIGS. 5A-5B may, for example, be performed by the system device 110 of the QKD device 100 shown in FIG. 1, which may in turn be embodied by apparatus 200, which is shown and described in connection with FIG. 2A. To perform the operations described below, the apparatus 200 may utilize one or more of processor 202, memory 204, communications hardware 206, entangled particle generation hardware 208, quantum analysis engine 210, recordation engine 212, key verification engine 214, secure key generator 216, and/or any combination thereof.

Meanwhile, the various operations described in connection with FIGS. 6A-8B may be performed by participating device 220, which may utilize one or more of processor 222, memory 224, communications hardware 226, key verification engine 228, secure key generator 230, failover engine 232, and/or any combination thereof.

Turning first to FIG. 5A, example operations are shown for distributing entangled particles (e.g., the N-way entangled particles) to a plurality of participating devices within a distributed system.

As shown by operation 500, the QKD device 100 includes means, such as entangled particle generation hardware 208, or the like for generating N-way entangled particles. To simplify explanation, reference is made to generation of three-way entangled particles (i.e., a set of N-way entangled particles containing three (3) entangled particles). However, it should be appreciated that the entangled particle generation hardware 208 may be utilized to generate any number of particles entangled with any number of other particles (i.e., N-way entanglement). The three-way entangled particles may be generated as a single set, in a continuous stream, and/or at regular time intervals (e.g., once per second, once per minute, etc.). The entangled particle generation hardware 208 may generate the three-way entangled particles before or after establishing a connection to a participating device (e.g., participating device 140A). In some embodiments, in response to generating the entangled particles, the QKD device (e.g., via recordation engine 212) may record data regarding the generation (e.g., the location, time, description, and/or the like) to the log file. Refer to FIGS. 3A-4C for additional details regarding generation of N-way entangled particles.

In some embodiments, the QKD device may utilize quantum analysis engine 210 to determine whether the participating devices (three participating devices in this example) are quantum enabled. The participating devices may be quantum enabled if they possess the ability to receive and measure entangled particles from the QKD device. If the three participating devices are quantum enabled, the method may proceed to operation 501.

As shown by operation 501, the QKD device 100 includes means, such as communications hardware 206, or the like for transmitting the entangled particles to a plurality of participating devices. Continuing with the above example, three entangled particles may be transmitted to three participating devices (e.g., participating devices 140A-140C) with one entangled particle of the three entangled particles being transmitted to each of participating devices 140A-140C over a communications network (e.g., communications network 130). As previously mentioned, entangled particles may be generated as an individual set, in a continuous stream, and/or at previously established time intervals. Therefore, the QKD device may transmit the entangled particles individually, continuously, and/or at previously established time intervals to the participating devices 140A-140C. By doing so, the QKD device may transmit an arbitrarily long sequence of entangled particles to each participating device, wherein the length of the sequence may be selected based on the desired size of a secure key to be used. In some embodiments, in response to transmitting the entangled particles, the QKD device (e.g., via recordation engine 212) may record data regarding the transmission (e.g., the location, time, description, and/or the like) to one or more log files stored by the QKD device (e.g., stored in memory 204 of apparatus 200).

In the event one or more participating devices of the plurality of participating devices are not quantum enabled, the QKD device may generate a key (via secure key generator 216) by reading (e.g., measuring) one or more of the entangled particles. By doing so, the QKD device may be securely transported to the location of the non-quantum enabled participating device and may locally inject the key into the non-quantum enabled participating device.

In the event the QKD device takes part in device authentication, the QKD device may obtain key check values from other participating devices and compare them (via the key verification engine 214) to a key check value (KCV) obtained locally by the QKD device. A KCV may include a non-secret value that is cryptographically derived from a key (e.g., a key based on measurement of one or more entangled particles generated by a QKD device) and is used to verify that the underlying value is as expected. For example, once the entangled particles are received by a first participating device of the plurality of participating devices from the QKD device as described above, the first participating device may provide a KCV that is based on the entangled particles to the QKD device. In some embodiments, the key check value may represent data associated with the entangled particles themselves. For example, the first participating device may measure the entangled particles to generate a key, and subsequently generate a key check value based on the key. In other embodiments, the key check value may include metadata relating to the reception of the entangled particles. For example, the metadata may include a timestamp (e.g., a time and/or date which the entangled particles were received), an identifier or credential associated with the first participating device, and/or other values or information that provide proof that the first device is the device that received the entangled particles and/or the correct device to have received the entangled particles.

If the key check values match, the QKD device may determine that a secure connection may be established between the QKD device and one or more participating devices. Alternatively, any shared secret (other than KCVs) may be exchanged to establish a connection between the QKD device and one or more participating devices. The shared secret may include, for example, at least a portion of the key and/or other values derived from the key.

As shown by operation 502, QKD device 100 may include means, such as communications hardware 206, or the like for receiving an acknowledgement of receipt of the N-way entangled particles from the participating devices. The acknowledgment may be received following each transmission of N-way entangled particles to the participating devices to verify the success of the transmission.

As noted above, the QKD device may generate entangled particles and transmit the entangled particles to any number of participating devices to facilitate authentication between multiple devices. Turning to FIG. 5B, a diagram is shown illustrating example operations performed by components of a distributed system during distribution of entangled particles to a plurality of participating devices. In this figure, operations performed by an entangled particle generation hardware of a QKD device are shown along the line extending from the box labeled "entangled particle generation hardware 505." Similarly, operations performed by participating devices are shown along the lines extending from the boxes labeled "participating device 503A," "participating device 503B," and "participating device 503C." Operations impacting two or more devices, such as data transmissions between devices, are shown using arrows extending between these lines. Generally, the operations are ordered temporally with respect to one another. However, it will be appreciated that the operations may be performed in other orders from those illustrated herein.

At operation 506, entangled particle generation hardware 505 generates three entangled particles (e.g., a three-way entangled particles set). Entangled particles may be generated to provide a shared secret (e.g., shared key check values, shared key(s), etc.) to participating devices 503A-503C, to facilitate authentication, and/or to secure communication of sensitive information between these devices. When generated, the entangled particles may include keys unknown to the entangled particle generation hardware 505 (e.g., by refraining from measuring or otherwise characterizing the generated entangled particles) and, therefore, the entangled particles may be in an indeterminate state.

At operations 507, 508, and 509, entangled particle generation hardware 505 transmits the three-way entangled particles generated in operation 506 to all of participating devices 503A-503C. The three-way entangled particles may be transmitted via an optical fiber or other transmission medium. The entangled particle generation hardware 505 may transmit a first entangled particle of the three-way entangled particles to participating device 503A, a second entangled particle of the three-way entangled particles to participating device 503B, and a third entangled particle of the three-way entangled particles to participating device 503C.

In order to obtain a shared secret (e.g., a key, key check value derived from the key, or the like) from the entangled particles, participating devices 503 A-503C may read (e.g., measure) the entangled particles. At operations 510, 511, and 512, participating devices 503A-503C respectively read the entangled particles. Reading the entangled particles may collapse the entanglement and allow the participating devices 503A-503C to obtain identical keys without having the participating devices transmit the keys to one another.

Operations 506-512 may be repeated any number of times and may be performed continuously, at regular intervals, and/or in response to a request or event within the distributed system.

Figure 6A:
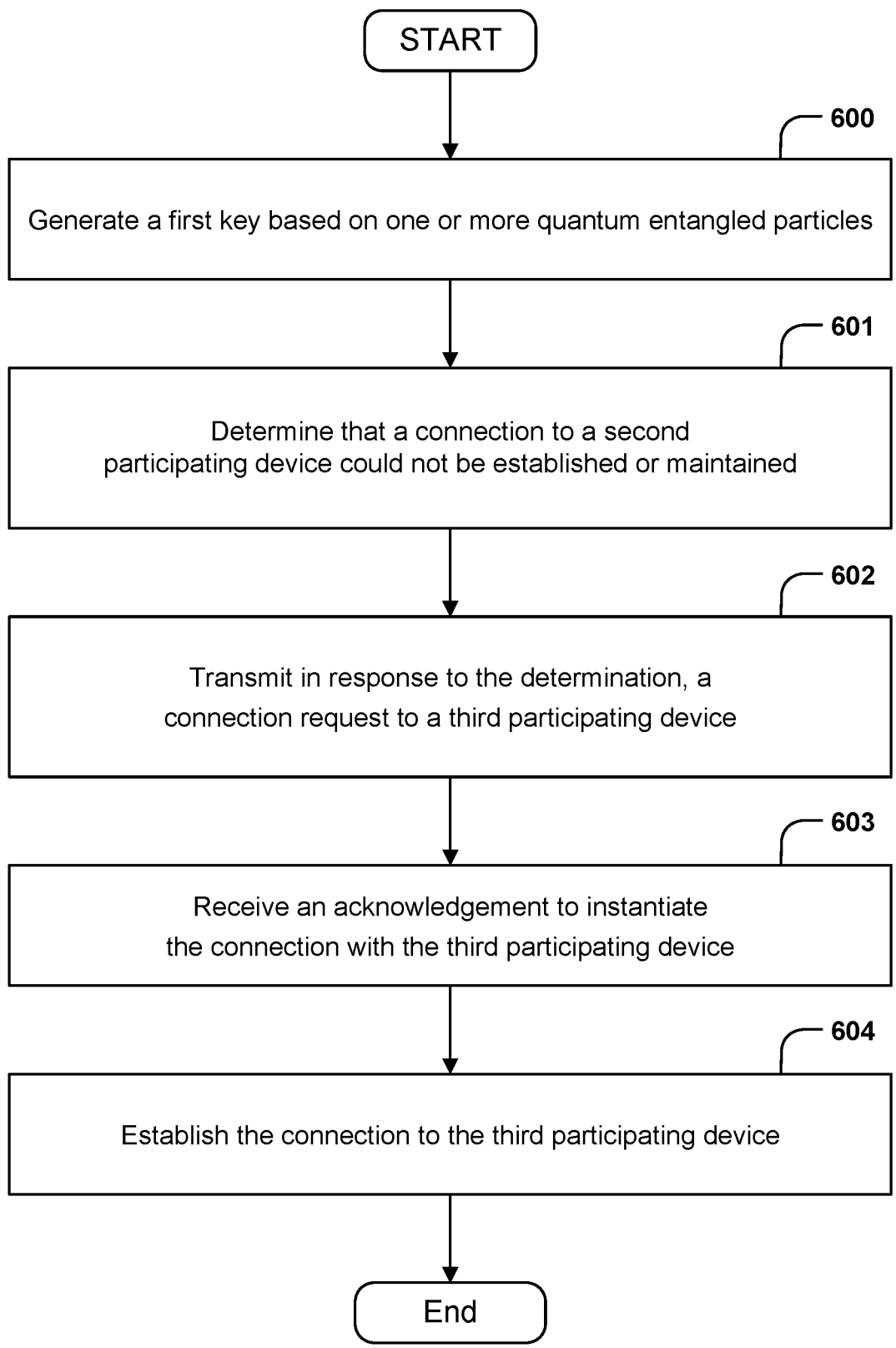
FIG. 6A illustrates an example flowchart for a failover process using N-way entangled particles, in accordance with some example embodiments described herein.

Turning now to FIG. 6A, example operations are shown for performing a failover process when a connection between a first participating device and a second participating device could not be established or maintained (e.g., it is terminated, lost, disconnected, etc.). The connection might not have been able to be established or maintained due to, for example, network disruptions, device hardware or software errors, external issues (e.g., sunspots, electromagnetic pulses (EMPs), or the like), and/or other factors. In some embodiments, the operations discussed in FIG. 6A may be performed by the first participating device. The failover process may be facilitated by the distribution of N-way entangled particles as described below.

Prior to determining that the connection between the first participating device and the second participating device could not be established or maintained, the first, second, and third participating devices may obtain and read entangled particles from a QKD device (via secure key generator 230) as shown in FIGS. 5A-5B. Therefore, the first, second, and third participating devices may all have access to a shared secret (e.g., an identical key and/or key check value derived from the key) for authenticating secure connections between the three participating devices. Specifically, a first key, a second key, and a third key may be respectively generated by the first participating device, the second participating device, and the third participating device from respective sets of quantum entangled particles received from the QKD device. The respective sets of quantum entangled particles may be components of an N-way entangled particle set generated by the QKD device and distributed to the first participating device, the second participating device, and the third participating device.

As shown by operation 600, the participating device 220 includes means, such as secure key generator 230, or the like for generating a first key based on one or more quantum entangled particles received from the QKD device. To generate the first key, participating device 220 may obtain the one or more entangled particles from the QKD device (e.g., via a communications network such as communications network 130) and may measure (e.g., read) the one or more quantum entangled particles to obtain the first key. Refer to FIGS. 5A-5B for additional information regarding obtaining and reading quantum entangled particles.

As shown by operation 601, the participating device 220 includes means, such as communications hardware 226 with the input-output circuitry (not shown) of the communications hardware 226, or the like for determining that a connection to a second participating device could not be established or maintained. To determine that the connection to the second participating device could not be established or maintained, the first participating device may transmit a connection request (e.g., a quantum hello message using the shared secret) to the second participating device via communications network 130. The connection request may include a shared secret (e.g., an indication of the first key, at least a portion of the first key, a key check value, and/or any other value derived from the first key) obtained by the first participating device via reading the entangled particles. An error may occur with the connection request and, therefore, the connection request may not be established. In a first scenario, the connection may not be established due to a timed-out connection request because of not receiving a response back from the second participating device within a predetermined connection request time window. In a second scenario, the connection may not be maintained due to disconnection of an existing connection between the first and second participating devices. In a third scenario, an error may occur with the connection request due to receipt of an error code (at various network protocol levels) in response to a connection request. Connections may not be established or maintained for other reasons and unsuccessful connection requests may encounter errors via other methods without departing from embodiments disclosed herein.

Following the determination that the connection between the first participating device and the second participating device could not be established or maintained, the first participating device may initiate a failover process via the failover engine 232. The failover engine 232 may determine the need for a connection to be established with a third participating device, the third participating device being expected to have access to an identical key via the earlier distribution of three-way entangled particles. Therefore, the failover engine 232 may transmit a connection request to the third participating device as described below.

As shown by operation 602, participating device 220 includes means, such as communications hardware 226 with the input-output circuitry (not shown) of the communications hardware 226, or the like for transmitting a connection request to a third participating device in response to the determination in operation 601. The connection request may include an indication of a shared secret (e.g., at least a portion of the key, the key check value, and/or any other value derived from the key) obtained by the first participating device from the earlier distributed three-way entangled particles and may be transmitted over communications network 130.

As shown by operation 603, participating device 220 includes means, such as communications hardware 226, or the like for receiving an acknowledgement to instantiate the connection with the third participating device. The acknowledgement received from the third participating device may include a confirmation that the shared secret transmitted as part of the connection request from the first participating device matches the shared secret obtained by the third participating device via the earlier reading of the three-way entangled particles and evaluation of the indication of the key. Therefore, the first participating device and the third participating device may have access to a shared secret and may securely exchange sensitive information (i.e., a key check value stored by the third participating device satisfies a key check value received from the first participating device).

As shown by operation 604, participating device 220 includes means, such as communications hardware 226, or the like for establishing the connection to the third participating device. Establishing the connection to the third participating device may include agreeing on a shared method for encoding (e.g., encrypting) sensitive information (e.g., a cryptographic key). The shared method may be previously established, may be shared as part of the acknowledgement, and/or may be established by one of the participating devices following operation 603.

Alternatively, the first participating device may transmit a connection request to the second participating device and third participating device (e.g., in response to disconnection, timed out request, receipt of an error code, or the like). The first participating device may receive a response (e.g., a notification of successful authentication) from the third participating device before receiving a response from the second participating device. In this example, the first participating device may preferentially establish a connection to the third participating device.

Figure 6B:
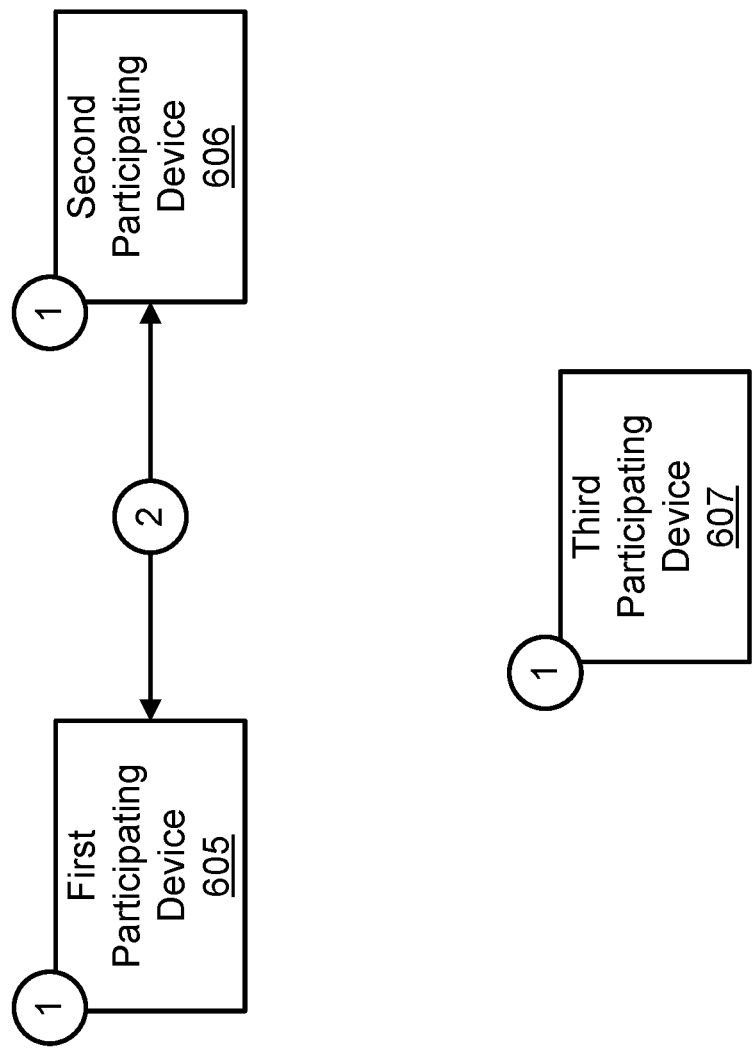
FIGS. 6B-6C illustrate an implementation example of the failover process using N-way entangled particles, in accordance with some example embodiments described herein.
Figure 6C:
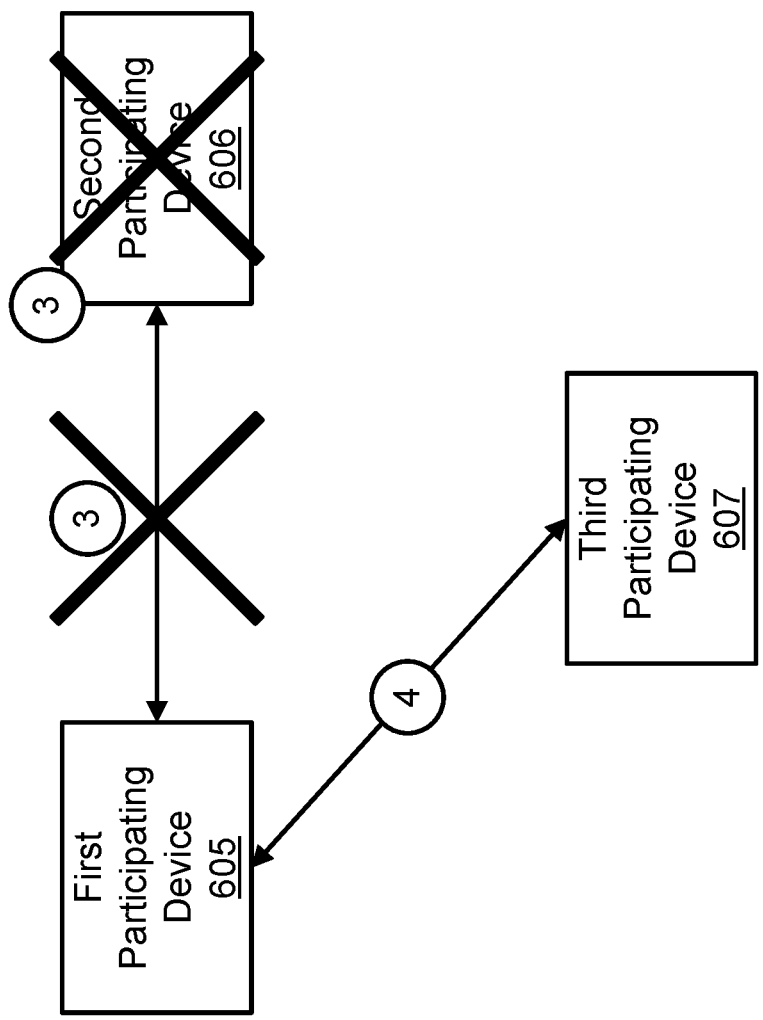

As noted above, a first participating device may initiate a failover process in the event a connection with a second participating device cannot be established or maintained. Turning to FIGS. 6B-6C, diagrams are shown illustrating an implementation example of the failover process discussed in FIG. 6A. In these figures, three participating devices are shown as boxes labeled "first participating device 605," "second participating device 606," and "third participating device 607." Circles containing numbers are used to indicate operations occurring at different points in time. For example, all operations described with reference to the number one (1) may occur at a first point in time and all operations described with reference to the number two may occur at a second point in time after the first point in time. While the operations are provided in temporal order (e.g., time point one before time point two), it will be appreciated that the operations may be performed in other orders from those illustrated herein.

Turning to FIG. 6B, a first participating device 605, a second participating device 606, and a third participating device 607 are shown. At time point one (indicated by the circles containing the number one), the first participating device 605, the second participating device 606, and the third participating device 607 may obtain three-way entangled particles (e.g., from a QKD device) and read the three-way entangled particles to obtain identical keys. At time point two (indicated by the circle containing the number 2), the first participating device 605 may attempt to connect to the second participating device 606.

Turning to FIG. 6C, at time point three (indicated by the circles containing the number three), it is determined that a connection between the first participating device 605 and the second participating device 606 cannot be established or maintained.

As a result, at time point four (indicated by the circle containing the number four), the first participating device initiates a failover process and attempts to connect to the third participating device 607. Because the third participating device 607 already holds the same key, the third participating device is able to quickly authenticate the first participating device 605 in order to establish a connection with the first participating device.

Figure 7A:
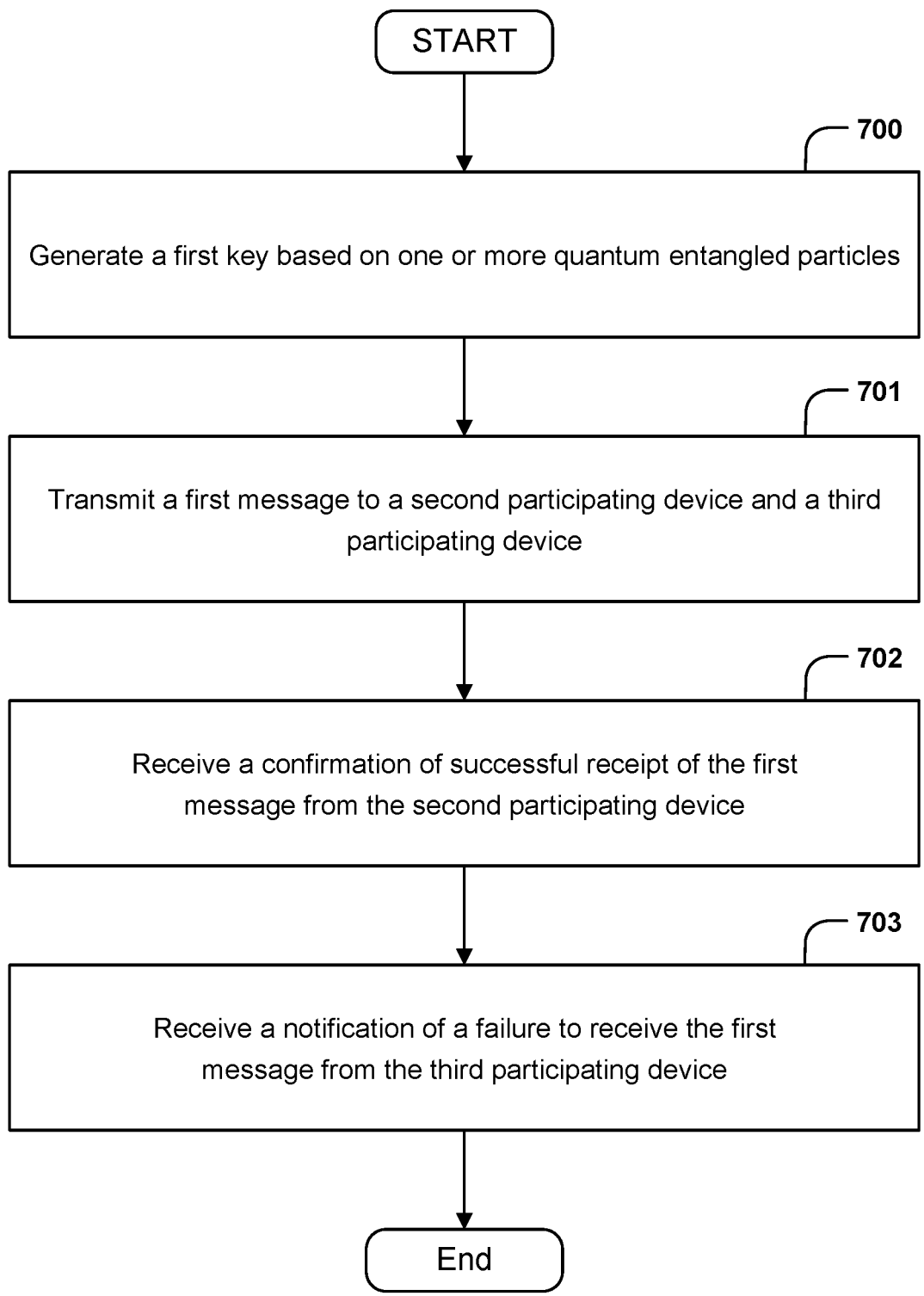
FIG. 7A illustrates an example flowchart for group messaging using N-way entangled particles, in accordance with some example embodiments described herein.

Turning to FIG. 7A, example operations are shown for performing group messaging between a plurality of participating devices, each of the plurality of participating devices having access to identical keys obtained via reading entangled particles.

Prior to attempting to perform group messaging, a first participating device and a second participating devices may obtain and measure entangled particles from a QKD device (via secure key generator 230) as shown in FIGS. 5A-5B. Therefore, the first and second participating devices may both have access to a shared secret (e.g., a cryptographic key, an identical key check value, or the like) to authenticate secure connections between the first and second participating devices. However, a third participating device may not have received entangled particles from the QKD device and, therefore, may not have access to the key obtained by the first and second participating devices. Specifically, a first key and a second key may be respectively generated by the first participating device and the second participating device from respective sets of quantum entangled particles. The respective sets of quantum entangled particles may be components of an N-way entangled particle set generated by the QKD device and distributed to the first participating device and the second participating device.

At operation 700, the participating device 220 includes means, such as secure key generator 230, or the like for generating a first key based on one or more quantum entangled particles received from the QKD device. To generate the first key, participating device 220 may obtain the one or more entangled particles from the QKD device (e.g., via a communications network such as communications network 130) and may measure (e.g., read) the one or more quantum entangled particles to obtain the first key. Refer to FIGS. 5A-5B for additional information regarding obtaining and reading quantum entangled particles.

At operation 701, the participating device 220 includes means, such as communications hardware 226 with the input-output circuitry (not shown) of the communications hardware 226, or the like for transmitting a first message to a second participating device and a third participating device. The first message may be encoded (e.g., encrypted, transmitted with a message authentication code (MAC), or the like) using the first key (or at least a portion of the first key) obtained by the first participating device. The first message may include an indication of the first key. Therefore, only devices with access to the identical key may be able to decode and read the message. The first message may be a component of a broadcast message sent to a plurality of participating devices, some of which may have access to the key and some of which may not.

At operation 702, the participating device 220 includes means, such as communications hardware 226 with the input-output circuitry (not shown) of the communications hardware 226, or the like for receiving a confirmation of successful receipt of the first message from the second participating device. The second participating device may decode the first message using the key obtained by the second participating device and may transmit the acknowledgement to the first participating device following the decoding (e.g., decryption) and reading of the message. The acknowledgement may be intended to confirm that the second participating device has access to an identical key (e.g., the second key) to the first key obtained by the first participating device (i.e., an identical key check value that satisfies the key check value obtained by the first participating device) and used to encode the message. To confirm that the second key is identical to the first key, the participating device 220 may evaluate the indication of the first key included in the first message. The confirmation received by the participating device 220 may include an indication of the second key generated by the second participating device. In response to receiving the confirmation of successful receipt of the first message from the second participating device, the first participating device may determine that the first key and the second key are identical and confirm the authenticity of the confirmation received from the second participating device. To determine that the first key and the second key are identical, the indication of the first key may be used to obtain at least a portion of the first key (via, for example, decoding the indication of the first key) and comparing the at least a portion of the first key to a corresponding portion of the second key. Confirming the authenticity of the confirmation received from the second participating device may include instantiating a secure connection between the first participating device and the second participating device, transmitting a notification of successful authentication to the second participating device, and/or other actions.

At operation 703, the participating device 220 includes means, such as communications hardware 226 with the input-output circuitry (not shown) of the communications hardware 226, or the like for receiving a notification of a failure to receive the first message from the third participating device. The third participating device may not decode the first message due to the lack of an identical key. As previously mentioned, the third participating device may not have access to the identical key due to not receiving entangled particles from the QKD device. The notification of failure to receive the first message may be intended to notify the first participating device that the third participating device does not have access to an identical key to the key obtained by the first participating device.

Figure 7B:
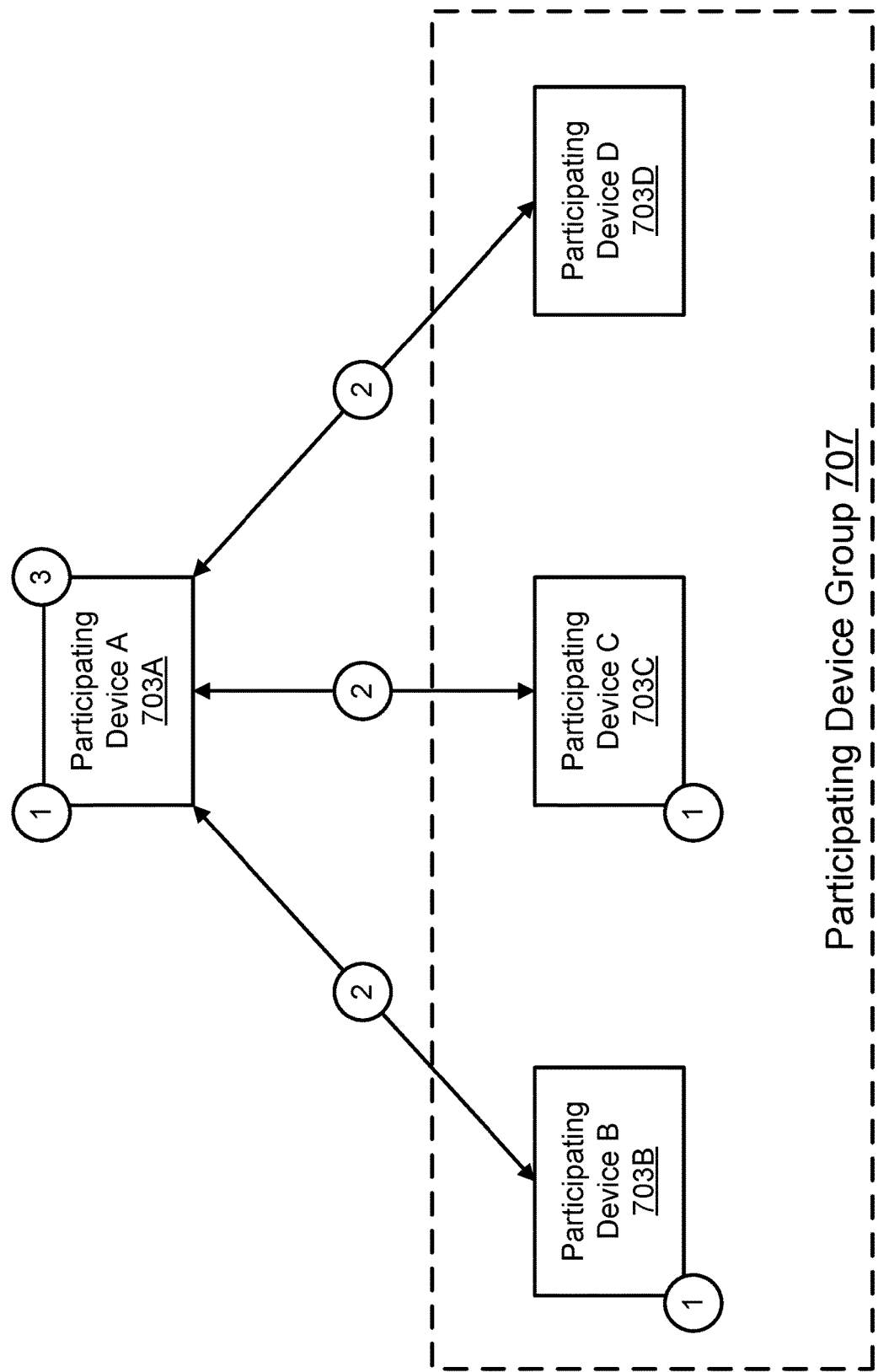
FIG. 7B illustrates an implementation example of the group messaging using N-way entangled particles, in accordance with some example embodiments described herein.

Turning to FIG. 7B, a diagram is shown illustrating example operations performed by components of a distributed system that may be performed during group messaging. In this figure, four participating devices are shown as boxes labeled "participating device 703A," "participating device 703B," "participating device 703C," and "participating device 703D." Circles containing numbers are used to indicate different points in time. For example, all operations described with reference to the number one (1) may occur at a first point in time and all operations described with reference to the number two may occur at a second point in time after the first point in time. While the operations are provided in temporal order (e.g., time point one before time point two), it will be appreciated that the operations may be performed in other orders from those illustrated herein.

In this example, participating device 703A may attempt to broadcast a group message to participating device group 707 (including participating device 703B, participating device 703C, and participating device 703D). At time point one (indicated by the circles containing the number one), participating device 703A, participating device 703B, and participating device 703C may obtain entangled particles (e.g., from a QKD device) and read the entangled particles to obtain identical keys.

At time point two (indicated by the circles containing the number two), participating device 703A may broadcast an encoded group message to participating device group 707.

At time point three (indicated by the circle containing the number 3), responses are received from participating device group 707 regarding the broadcasted message. For example, participating device 703A may receive a confirmation of successful decoding (e.g., decryption) of the broadcasted message from participating device 703B and from participating device 703C and a notification of decoding failure from participating device 703D.

Figure 8A:
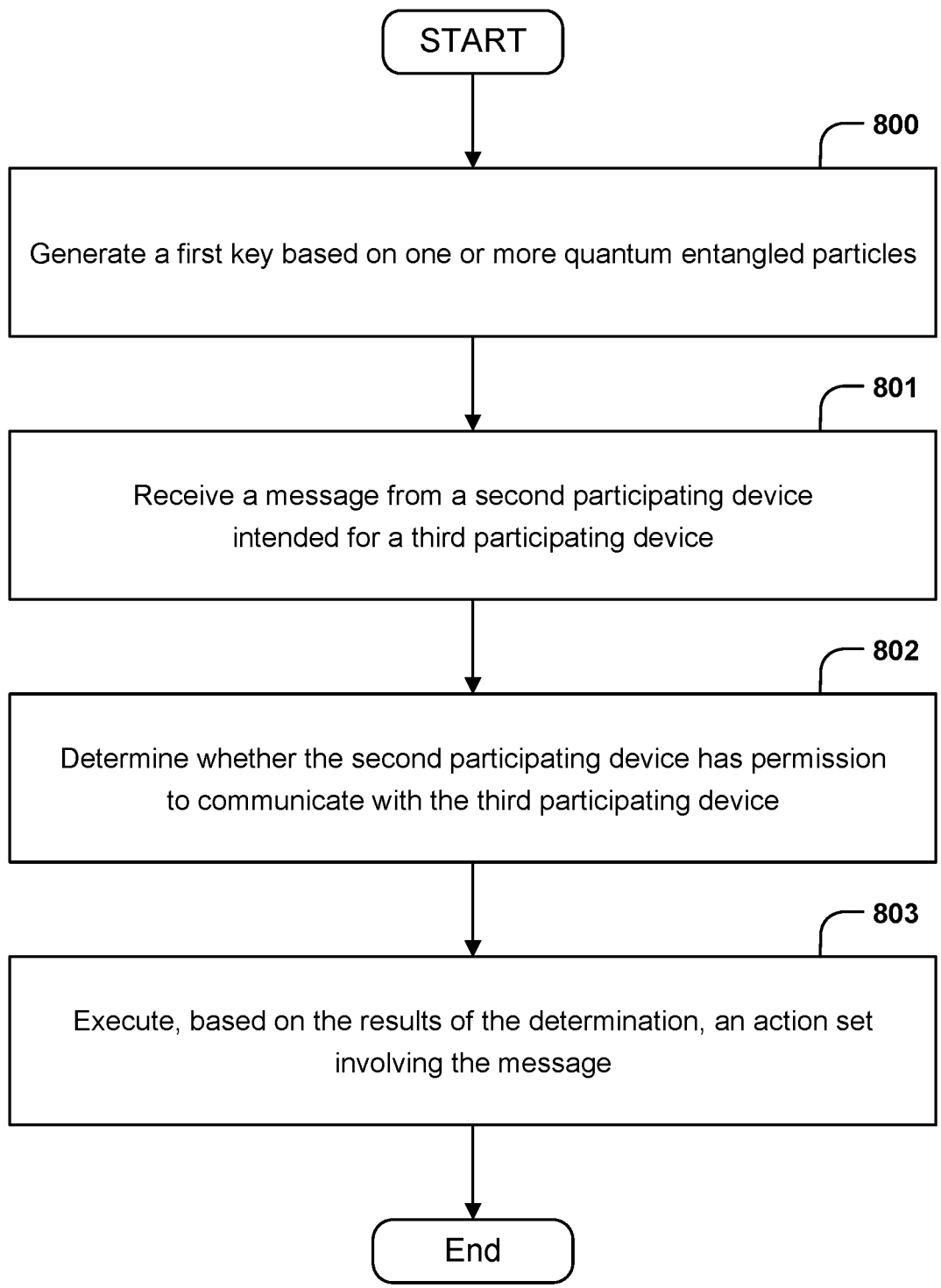
FIG. 8A illustrates an example flowchart for relaying messages between two participating devices via a security bridge using N-way entangled particles, in accordance with some example embodiments described herein.

Turning to FIG. 8A, example operations are shown for authentication between a plurality of participating devices in which a first participating device serves as a security bridge between a second participating device and a third participating device.

Prior to relaying messages between the second participating device and the third participating device, the first, second and third participating devices may obtain and measure entangled particles from a QKD device (via secure key generator 230) as shown in FIGS. 5A-5B. Therefore, the first, second, and third participating devices may all have access to a shared secret (e.g., a cryptographic key, an identical key check value derived from the key, or the like) to authenticate secure connections between the three participating devices. Specifically, a first key, a second key, and a third key may be respectively generated by the first participating device, the second participating device, and the third participating device from respective sets of quantum entangled particles received from the QKD device. The respective sets of quantum entangled particles may be components of an N-way entangled particle set generated by the QKD device and distributed to the first participating device, the second participating device, and the third participating device.

At operation 800, the participating device 220 includes means, such as secure key generator 230, or the like for generating a first key based on one or more quantum entangled particles received from the QKD device. To generate the first key, participating device 220 may obtain the one or more entangled particles from the QKD device (e.g., via a communications network such as communications network 130) and may measure (e.g., read) the one or more quantum entangled particles to obtain the first key. Refer to FIGS. 5A-5B for additional information regarding obtaining and reading quantum entangled particles.

At operation 801, the participating device 220 includes means, such as communications hardware 226 with the input-output circuitry (not shown) of the communications hardware 226, or the like for receiving a message from a second participating device intended for a third participating device. The message may include an indication of the second key generated by the second participating device, may be encoded (e.g., encrypted using a key (or a portion of the key), a message authentication code (MAC), or both (cipher-based message authentication code (CMAC)) obtained via reading entangled particles) and all three participating devices may have access to identical keys. However, the second participating device may be part of a public portion of a network and may not have permission to communicate directly with the third participating device (on a private portion of the network). The first participating device may serve as a security bridge (e.g., via a DMZ) between the public and private portions of the network.

At operation 802, the participating device 220 includes means, such as secure key generator 230, key verification engine 228, or the like for determining whether the second participating device has permission to communicate with the third participating device. The second participating device may have permission to communicate with the third participating device if both have access to identical keys via reading entangled particles. To confirm that the second participating device has permission to communicate with the third participating device, the first participating device may check that both the second and third participating devices have access to identical keys. To do so, the first participating device may evaluate the indication of the first key included in the message and may determine whether the first key is identical to the second key. The message obtained by the first participating device in operation 801 may be encoded using the a shared secret (e.g., encrypted using at least a portion of the second key, a KCV, or the like) obtained by the second participating device and, therefore, if the first participating device can decode the encoded message (e.g., using at least a portion of the first key), then the first participating device may confirm that the second participating device has access to the identical key. The message obtained by the first participating device may, alternatively, simply include the second key in some other way, such that the first participating device can confirm that the message contains the second key and, therefore, that the second participating device has access to the shared secret. To confirm that the third participating device has access to the identical shared secret, the first participating device may request a confirmation message from the third participating device including (e.g., encoded with) the third key obtained by the third participating device.

At operation 803, the participating device 220 includes means, such as secure key generator 230, key verification engine 228, or the like for executing, based on the determination in operation 802, an action set involving the message obtained from the second participating device. In the event the first participating device determines that the second participating device has permission to communicate with the third participating device (e.g., they have identical keys and/or KCVs), the action set may include forwarding the encoded message to the third participating device. In the event the first participating device determines that the second participating device does not have permission to communicate with the third participating device (e.g., they do not have identical keys), the action set may include dispositioning the message intended to be transmitted to the third participating device.

Dispositioning the message intended to be transmitted to the third participating device may include: (i) deleting the message intended to be transmitted to the third participating device, (ii) quarantining the message intended to be transmitted to the third participating device, (iii) transmitting an alert to the third participating device identifying the message as a potentially fraudulent event, and/or (iv) initiating a threat review of the message intended to be transmitted to the third participating device. Deleting the message may include permanently removing the message (and/or any indicator associated with the message) from storage (locally or off-site). Quarantining the message may include initiating additional authentication steps to verify the source of the message. The additional authentication steps may include requesting a new set of quantum entangled particles to be distributed to the three participating devices, requesting another authentication factor from the first participating device, and/or other actions. Transmitting the alert may include transmitting a message in the form of an email, text message, and/or a notification in an application on a device. Initiating the threat review may include further analysis of the message itself, further authentication steps as described above, and/or other actions.

Figure 8B:
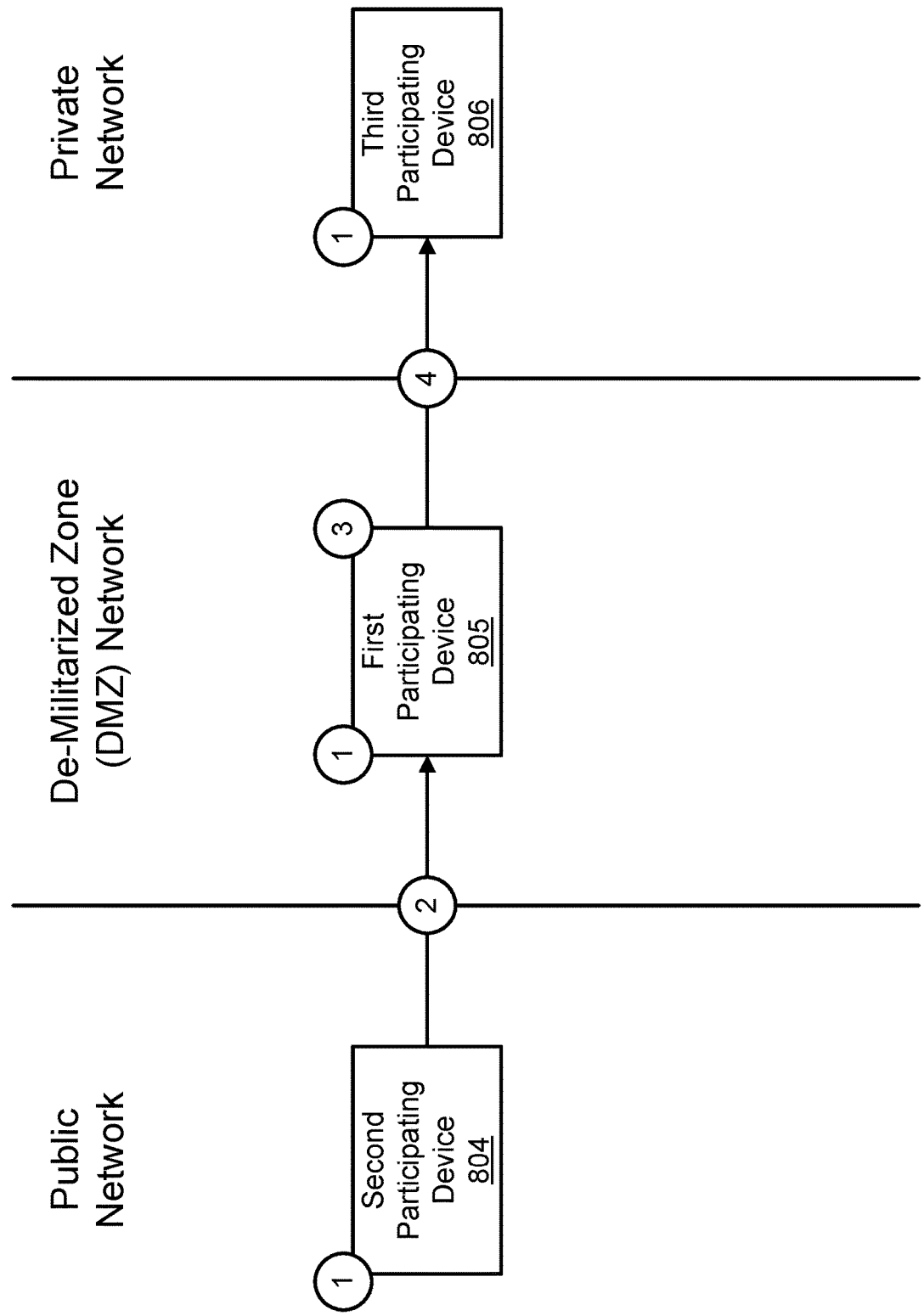
FIG. 8B illustrates an implementation example of relaying messages between two participating devices via a security bridge using N-way entangled particles, in accordance with some example embodiments described herein.

Turning to FIG. 8B, a diagram is shown illustrating example operations that may be performed by components of a distributed system when a participating device serves as a security bridge between public and private portions of a network. In this figure, three participating devices are shown as boxes labeled "first participating device 805," "second participating device 804," and "third participating device 806." The second participating device 804 may be housed on a public portion of a network, the third participating device 806 may be housed on a private portion of the network, and the first participating device 805 may be housed in a DMZ serving as a security bridge between the public network and the private portions of the network. Circles containing numbers are used to indicate different points in time. For example, all operations described with reference to the number one (1) may occur at a first point in time and all operations described with reference to the number two may occur at a second point in time after the first point in time. While the operations are provided in temporal order (e.g., time point one before time point two), it will be appreciated that the operations may be performed in other orders from those illustrated herein.

At time point one (indicated by the circles containing the number one), second participating device 804, first participating device 805, and third participating device 806 may obtain entangled particles (e.g., from a QKD device) and read the entangled particles to obtain identical keys.

At time point two (indicated by the circle containing the number two), second participating device 804 may transmit a message to first participating device 805. The message may be encoded using, as an example, the at least a portion of the key obtained by the second participating device and intended to match the key obtained by the first and third participating devices.

At time point three (indicated by the circle containing the number three), first participating device 805 may determine whether the second participating device 804 has permission to communicate with the third participating device 806 (e.g., by successfully decoding the message from the second participating device 804). The second participating device 804 may have permission to communicate with the third participating device 806 if the second and third participating devices have access to identical keys (that also match the key obtained by the first participating device 805).

At time point four (indicated by the circle containing the number four), the first participating device 805 may forward the message obtained from the second participating device 804 to the third participating device 806, thereby facilitating secure communications between the public and private networks.

As described above, example embodiments provide methods and apparatuses that enable improved authentication between multiple devices using N-way entangled particles. N-way entangled particles may be distributed to any number of devices within a distributed system. By doing so, a plurality of devices may be authenticated to participate in secure communications and, therefore, improve network security (e.g., by implementing a failover processes).

As these examples all illustrate, example embodiments contemplated herein provide technical solutions that solve real-world problems faced during transmission of data between devices in a distributed network. And while securing the exchange of sensitive information has been an issue for decades, the easier access to communication networks made available by recently emerging technology today has made this problem significantly more acute, which results in a more significant demand for quantum-based data security solutions. At the same time, recent advancements in entangled particle generation processes have unlocked new avenues to solving this problem that historically were not available, and example embodiments described herein thus represent a technical solution to these real-world problems.

FIGS. 5A-8B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for authentication between multiple devices within a communication network comprising a quantum key distribution (QKD) device and a plurality of participating devices that are operably connected to one another, the method being initiated by a first participating device among the plurality of participating devices and comprising:

generating, by a secure key generator, a first key based on one or more quantum entangled particles received from the QKD device;

determining, by communications hardware, that a connection to a second participating device among the plurality of participating devices could not be established or maintained;

in response to determining that the connection to the second participating device could not be established or maintained, transmitting, by the communications hardware, a first connection request to establish a connection with a third participating device among the plurality of participating devices;

receiving, by the communications hardware and in response to the third participating device confirming that the first key is identical to a third key generated by the third participating device, an acknowledgement to instantiate the connection with the third participating device; and
establishing, by the communications hardware, the connection with the third participating device.

2. The method of claim 1, wherein the first key, a second key generated by the second participating device, and the third key are respectively generated by the first participating device, the second participating device, and the third participating device from respective sets of quantum entangled particles received from the QKD device.

3. The method of claim 2, wherein the respective sets of quantum entangled particles are components of an N-way entangled particle set generated by the QKD device and distributed to the first participating device, the second participating device, and the third participating device.

4. The method of claim 1, wherein determining that the connection to the second participating device could not be established or maintained comprises:
transmitting, by the communications hardware and to the second participating device, a second connection request to connect with the second participating device;
determining, by the communications hardware and after the transmitting, that an error has occurred with the second connection request; and
in response to determining that the error has occurred with the second connection request, instantiating, by a failover engine, a failover process comprising transmitting the first connection request.

5. The method of claim 1, wherein determining that the connection to the second participating device could not be established or maintained comprises:
determining, by a failover engine, that an existing connection to the second participating device is disconnected; and
in response to determining that the existing connection to the second participating device is disconnected, instantiating, by the failover engine, a failover process comprising transmitting the first connection request.

6. The method of claim 1, wherein the first connection request comprises an indication of the first key.

7. The method of claim 6, wherein confirmation by the third participating device that the first key is identical to the third key comprises evaluation of the indication of the first key.

8. A first participating device among a plurality of participating devices within a communication network comprising the plurality of participating devices and a quantum key distribution (QKD) device, the first participating device comprising:
a secure key generator configured to generate a first key based on one or more quantum entangled particles received from the QKD device; and
communications hardware configured to:
determine that a connection to a second participating device among the plurality of participating devices could not be established or maintained;
transmit, in response to determining that the connection to the second participating device could not be established or maintained, a first connection request to establish a connection with a third participating device among the plurality of participating devices;
receive, in response to the third participating device confirming that the first key is identical to a third key generated by the third participating device, an acknowledgement to instantiate the connection with the third participating device; and
establish the connection with the third participating device.

9. The first participating device of claim 8, wherein the first key, a second key generated by the second participating device, and the third key are respectively generated by the first participating device, the second participating device, and the third participating device from respective sets of quantum entangled particles received from the QKD device.

10. The first participating device of claim 9, wherein the respective sets of quantum entangled particles are components of an N-way entangled particle set generated by the QKD device and distributed to the first participating device, the second participating device, and the third participating device.

11. The first participating device of claim 8, wherein to determine that the connection to the second participating device could not be established or maintained, the communications hardware is further configured to:
transmit, to the second participating device, a second connection request to connect with the second participating device; and
determine, after the transmitting, that an error has occurred with the second connection request,
wherein the first participating device further comprises a failover engine configured to:
instantiate, in response to determining that the error has occurred with the second connection request, a failover process comprising transmitting the first connection request.

12. The first participating device of claim 8, wherein to determine that the connection to the second participating device could not be established or maintained, the first participating device further comprises:
a failover engine configured to:
determine that an existing connection to the second participating device is disconnected; and
instantiate, in response to determining that the existing connection to the second participating device is disconnected, a failover process comprising transmitting the first connection request.

13. The first participating device of claim 8, wherein the first connection request comprises an indication of the first key.

14. The first participating device of claim 13, wherein confirmation by the third participating device that the first key is identical to the third key comprises evaluation of the indication of the first key.

15. A non-transitory computer-readable storage medium for authentication between multiple devices within a communication network comprising a quantum key distribution (QKD) device and a plurality of participating devices that are operably connected to one another, the non-transitory computer-readable storage medium storing instructions that, when executed, cause a first participating device of the plurality of participating devices to:
generate a first key based on one or more quantum entangled particles received from the QKD device;
determine that a connection to a second participating device among the plurality of participating devices could not be established or maintained;
in response to determining that the connection to the second participating device could not be established or maintained, transmit a first connection request to establish a connection with a third participating device among the plurality of participating devices;

receive, in response to the third participating device confirming that the first key is identical to a third key generated by the third participating device, an acknowledgement to instantiate the connection with the third participating device; and establish the connection with the third participating device.

16. The non-transitory computer-readable storage medium of claim 15, wherein the first key, a second key generated by the second participating device, and the third key are respectively generated by the first participating device, the second participating device, and the third participating device from respective sets of quantum entangled particles received from the QKD device.

17. The non-transitory computer-readable storage medium of claim 16, wherein the respective sets of quantum entangled particles are components of an N-way entangled particle set generated by the QKD device and distributed to the first participating device, the second participating device, and the third participating device.

18. The non-transitory computer-readable storage medium of claim 15, wherein determining that the connection to the second participating device could not be established or maintained comprises:

transmitting, to the second participating device, a second connection request to connect with the second participating device;

determining, after the transmitting, that an error has occurred with the second connection request; and in response to determining that the error has occurred with the second connection request, instantiating a failover process comprising transmitting the first connection request.

19. The non-transitory computer-readable storage medium of claim 15, wherein determining that the connection to the second participating device could not be established or maintained comprises:

determining that an existing connection to the second participating device is disconnected; and in response to determining that the existing connection to the second participating device is disconnected, instantiating a failover process comprising transmitting the first connection request.

20. The non-transitory computer-readable storage medium of claim 15, wherein the first connection request comprises an indication of the first key.

\* \* \* \* \*